(12) United States Patent
Jana et al.

(10) Patent No.: US 9,756,112 B2
(45) Date of Patent: Sep. 5, 2017

(54) METHOD AND SYSTEM FOR MANAGING SERVICE QUALITY ACCORDING TO NETWORK STATUS PREDICTIONS

(71) Applicant: AT&T Intellectual Property I, LP, Atlanta, GA (US)

(72) Inventors: Rittwik Jana, Montville, NJ (US); Jeffrey Erman, Morristown, NJ (US); Vijay Gopalakrishnan, Edison, NJ (US); Emir Halepovic, Somerset, NJ (US); Rakesh Sinha, Edison, NJ (US); Xuan Kelvin Zou, Princeton, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 199 days.

(21) Appl. No.: 14/659,736

(22) Filed: Mar. 17, 2015

(65) Prior Publication Data
US 2016/0234078 A1 Aug. 11, 2016

Related U.S. Application Data

(60) Provisional application No. 62/114,817, filed on Feb. 11, 2015.

(51) Int. Cl.
*H04L 12/24* (2006.01)
*H04L 29/08* (2006.01)
*H04L 12/911* (2013.01)
*H04L 12/825* (2013.01)
*H04L 12/835* (2013.01)

(52) U.S. Cl.
CPC ............ *H04L 67/02* (2013.01); *H04L 47/25* (2013.01); *H04L 47/30* (2013.01); *H04L 47/823* (2013.01)

(58) Field of Classification Search
CPC .......................... H04L 41/5003; H04L 67/02
USPC ..... 709/217, 219, 223, 224; 370/230.1, 235, 370/412
See application file for complete search history.

(56) References Cited

U.S. PATENT DOCUMENTS

| | | | |
|---|---|---|---|
| 6,269,078 B1 * | 7/2001 | Lakshman | .......... H04L 12/5695 370/230 |
| 7,499,453 B2 | 3/2009 | Carlson et al. | |
| 8,307,108 B2 | 11/2012 | Chen et al. | |
| 8,391,896 B2 | 3/2013 | Curcio et al. | |

(Continued)

OTHER PUBLICATIONS

"Playout Buffer and Rate Optimization for Streaming over IEEE 802.11 Wireless Networks"—Li et al, Worcester Polytechnic Institute, Aug. 2009 http://web.cs.wpi.edu/~rek/Research/Papers/TOMCCAP09.pdf.*

(Continued)

*Primary Examiner* — Randy Scott
(74) *Attorney, Agent, or Firm* — Guntin & Gust, PLC; Douglas Schnabel

(57) ABSTRACT

Aspects of the subject disclosure may include, for example, obtaining predicted available bandwidths for an end user device, monitoring buffer occupancy of a buffer of the end user device, determining bit rates for portions of media content according to the predicted available bandwidths and according to the buffer occupancy, and adjusting bit rates for portions of media content according to the predicted available bandwidths and according to the buffer occupancy during streaming of the media content to the end user device over a wireless network. Other embodiments are disclosed.

20 Claims, 20 Drawing Sheets

(56) References Cited

U.S. PATENT DOCUMENTS

| | | |
|---|---|---|
| 8,443,404 B2 | 5/2013 | Chetlur et al. |
| 8,812,673 B2 | 8/2014 | Balachandran et al. |
| 8,854,958 B2 | 10/2014 | Gell et al. |
| 8,959,244 B2* | 2/2015 | Lin .............................. 709/231 |
| 2006/0003767 A1* | 1/2006 | Kim ..................... H04W 36/18 455/436 |
| 2006/0067214 A1 | 3/2006 | Ramachandran |
| 2010/0312905 A1 | 12/2010 | Sandmann et al. |
| 2012/0005365 A1* | 1/2012 | Ma ..................... G06Q 30/0241 709/231 |
| 2012/0157106 A1* | 6/2012 | Wang ................... H04W 16/04 455/446 |
| 2012/0331106 A1 | 12/2012 | Ramamurthy et al. |
| 2013/0035107 A1 | 2/2013 | Chan et al. |
| 2013/0133011 A1 | 5/2013 | Chhaochharia et al. |
| 2013/0263167 A1 | 10/2013 | Parthasarathy et al. |
| 2014/0082192 A1 | 3/2014 | Wei |
| 2014/0146693 A1 | 5/2014 | Chetlur et al. |
| 2016/0135076 A1* | 5/2016 | Grinshpun ........ H04W 28/0284 370/235 |

OTHER PUBLICATIONS

Agboma, et al., "Quality of experience management in mobile content delivery systems." Telecommunication Systems 49.1 (2012): 85-98.

Haakon, Riiser et al., "Bitrate and video quality planning for mobile streaming scenarios using a GPS-based bandwidth lookup service." Multimedia and Expo (ICME), 2011 IEEE International Conference on. IEEE, 2011.

Oyman, et al., "Quality of experience for HTTP adaptive streaming services." Communications Magazine, IEEE 50.4 (2012): 20-27.

\* cited by examiner

200

300

400

FIG. 5
| Metric | Description | Resolution |
|--------|-------------|------------|
| CQI | Channel Quality Indicator | 1 sec |
| RSRQ | Pilot Signal quality | 1sec |
| RRC | Radio resource connections | 1 min |
| HO | Hand over | 1 min |
FIG. 6
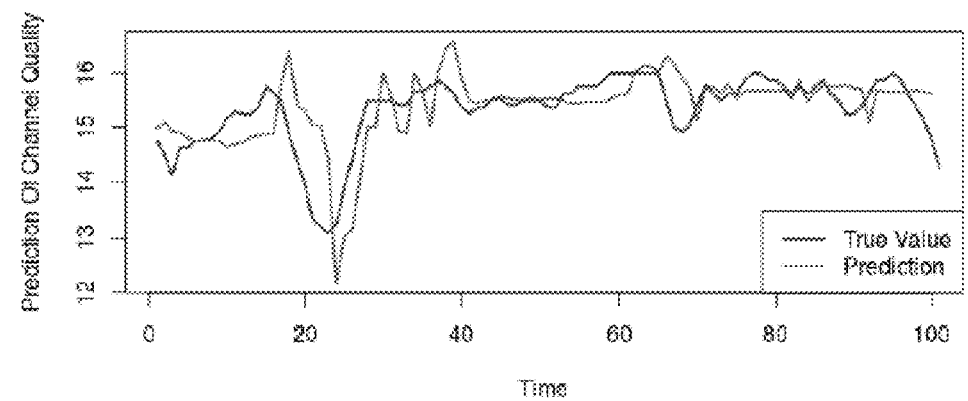
FIG. 7
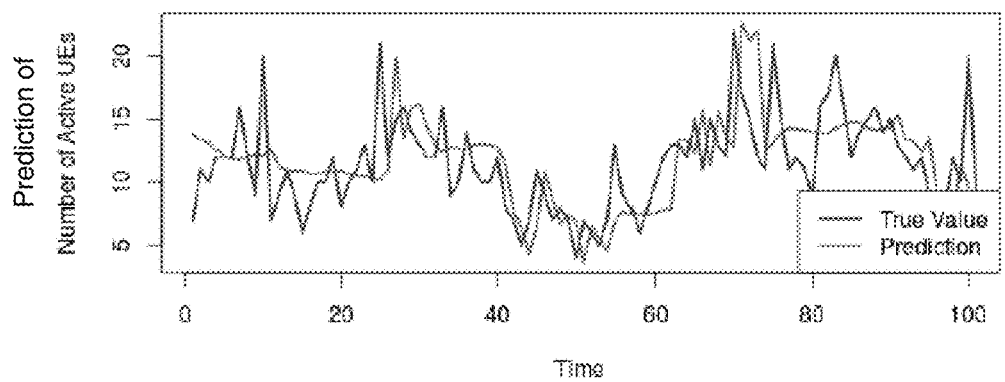

| Symbol | Meaning |
|---|---|
| $T$ | number of video chunks |
| $M$ | number of video quality levels (encoding bit rates) |
| $R_i$ | rate for the video with $i^{th}$ highest encoding bit rate |
| $x_i^t$ | binary variable indicating whether $R_i$ is the video play rate at time $t$ |
| $E$ | utilization of video download over available bandwidth |
| $\phi$ | number of video rate switches |
| $C$ | estimated bandwidth for the next chunk |
| $B$ | buffer occupancy (seconds of video) |
| $z$ | maximum buffer size (seconds of video) |
| $B_{risk}$ | threshold for buffer occupancy. Below this threshold is risky zone; above this threshold is safe zone |

FIG. 8

Input: $C$: Predicted available bandwidth
　　　　$B$: Buffer occupancy vector for last $t$ chunks
　　　　$R_{cur}$: Current video bit rate
Output: $Rate$: Rate for next chunk.
if $B_t > z$ then
　| Sleep for $B_t - z$ seconds
$ref = \arg\max(i : R_i \leq C)$;
if $B_t \leq B_{risk}$ then
　| $ref = ref - 1$;
if $R_{ref} < R_{cur}$ and $B_t < B_{risk}$ then
　| for $R \in [R_{ref}, R_{cur}]$ do
　|　| $BufferLoss = ChunkDuration * \frac{R-C}{C}$;
　|　| $\Delta B = B_t - B_{t-k} + ChunkDuration * k$;
　|　| if $\Delta B > BLoss$ then
　|　|　| Rate=$R$
　| end
else
　| if $R_{ref} > R_{cur}$ then
　|　| for $R \in [R_{cur}, R_{ref}]$ do
　|　|　| $BufferLoss = \alpha * (B - z) * \frac{R-R_{cur}}{R_{cur}}$;
　|　|　| $\Delta B = B_t - B_{t-k}$;
　|　|　| if $\Delta B > BLoss$ then
　|　|　|　| Rate=$R$
　|　| end
end

900
FIG. 9

| Improvement | Quality | Stability | Interruption |
|---|---|---|---|
| BBA(3G) | 1.16x | 2.87x | 1x |
| FESTIVE(3G) | 1.39x | 0.68x | 2.5x |
| BBA(4G) | 1.15x | 3.8x | 1x |
| FESTIVE(4G) | 1.32x | 3.6x | 1x |

|  | BBA | FESTIVE | Process 900 |
|---|---|---|---|
| Ramp-up Time | 560s | 260s | 144s |
| Link Loss(30s) | 1.05 Mbps | 1.05 Mbps | 4.3 Mbps |
| Link Loss(45s) | 1.05 Mbps | 1.05 Mbps | 1.05 Mbps |
| Link Loss(60s) | 0.235 Mbps | 1.05 Mbps | 1.05 Mbps |

| Symbol | Meaning |
|---|---|
| $Q$ | number of video quality levels (play bit rates) |
| $R_i^q$ | size of the $i$-th chunk at the $q$-th quality level |
| $x_i^q$ | binary variable indicating selection of $R_i^q$ |
| $C_i$ | predicted bandwidth for the $i$-th chunk duration |
| $L_i^j$ | portion of $i$-th chunk downloaded in duration $j$ |
| $M$ | maximum buffer size (in multiples of D) |

Algorithm    PBA Rate Selection

Input: $B$: Buffer occupancy
$C$: Predicted available bandwidth
$R_{last}$: Last downloaded video rate, initialized to the highest rate Output: $R_{next}$: Video rate for next chunk if $B > B_{max} - D$ then
    Sleep for $B + D - B_{max}$ seconds
$ref = \max\{i : R_i \leq C\}$
if $B \leq B_{risky}$ then
    $ref = \max\{ref - 1, 1\}$
    if $R_{ref} < R_{last}$ then
        $R_{next} = \max\left(\{R : \frac{B}{D} + \frac{C}{R} - 1 > 2\} \cup \{R_1\}\right)$
    else
        $R_{next} = R_{ref}$
else if $B \geq B_{safe}$ then
    $R_{next} = \max\{R_{ref}, R_{last}\}$
else
    if $R_{ref} \leq R_{last}$ then
        $R_{next} = R_{last}$
    else
        $\Delta B = D * (C/R_{ref} - 1)$
        $B_{empty} = B_{max} - B$
        if $\Delta B > 0.15 * B_{empty}$ then
            $R_{next} = R_{ref}$
        else
            $R_{next} = R_{ref-1}$

|  | %Avg.rate 360 s | %Avg.rate 32 s | Number of stalls | %Rate switches |
|---|---|---|---|---|
| Optimal | 100% | 100% | 0 | 100% |
| FESTIVE | 68.6% | 15.0% | 34 | 101.3% |
| BBA | 85.7% | 20.1% | 17 | 93.3% |
| PBA-BB | 95.8% | 84.8% | 31 | 43.0% |
| PBA-DU | 91.4% | 95.8% | 23 | 181.2% |

FIG. 23

| Stability function | Avg. rate, 360 s | | Avg. rate, 32 s | | Avg. rate, 64 s | | Time stalled | | Number of stalls | | Rate switches | |
|---|---|---|---|---|---|---|---|---|---|---|---|---|
| | Last | Har | Last | Har | Last | Har | Last | Har | Last | Har | Last | Har |
| Buffer-based | 0.4% | 4.8% | 10.0% | 17.9% | 4.6% | 13.8% | 35.2% | -10.3% | 22.6% | 0.0% | 34.8% | -11.9% |
| Delayed update | -1.7% | 0.0% | 11.3% | 17.3% | 4.3% | 11.8% | 132.9% | 184.5% | 60.6% | 139.1% | 10.0% | -63.6% |

FIG. 24

METHOD AND SYSTEM FOR MANAGING SERVICE QUALITY ACCORDING TO NETWORK STATUS PREDICTIONS

CROSS-REFERENCE TO RELATED APPLICATIONS

This application claims the benefit of U.S. Provisional Application No. 62/114,817, filed Feb. 11, 2015, the disclosure of which is hereby incorporated by reference in its entirety.

FIELD OF THE DISCLOSURE

The subject disclosure relates to a method and system for managing service quality according to network status predictions.

BACKGROUND

Video streaming can make up a large portion of traffic in cellular networks. Increasing numbers of users are watching videos on their cellular devices. Recent studies show that mobile video accounts for more than 50% of the cellular traffic today and is expected to grow fourteen fold by 2018. A recent study shows that between 40% and 73% of all videos played on mobile networks experience stalls. For every 60 seconds of video, users on 3G networks have experienced an average of 47 seconds of stall, while those on 4G networks have experienced 15 seconds of stall.

BRIEF DESCRIPTION OF THE DRAWINGS

Reference will now be made to the accompanying drawings, which are not necessarily drawn to scale, and wherein:

FIG. 5 depicts an illustrative embodiment of key performance indicators that can be utilized in the method of FIG. 4 and in portions of the systems described in FIGS. 1-2;

FIGS. 6-7 depict an illustrative embodiment of predictions that can be made in association with the method of FIG. 4 and in portions of the systems described in FIGS. 1-2;

FIG. 8 depicts an illustrative embodiment of variables and parameters that can be utilized in optimization in association with the method of FIG. 4 and in portions of the systems described in FIGS. 1-2 according to a first rate selection algorithm;

FIG. 9 depicts an illustrative embodiment of a rate selection process that can be used with the method of FIG. 4 and in portions of the systems described in FIGS. 1-2 utilizing the first rate selection algorithm;

FIG. 16 depicts an illustrative embodiment of variables and parameters that can be utilized in estimating the performance of an exemplary rate selection algorithm that has information of all future events. This level of information may not be available in practice but this exemplary algorithm serves as a baseline to judge the performance of the proposed invention described in FIG. 21.

FIG. 21 depicts an illustrative embodiment of another rate selection process that can be used with the process associated with FIG. 16;

FIGS. 23-24 depict an illustrative embodiment of a comparison between an exemplary bit rate selection process and other streaming algorithms.

DETAILED DESCRIPTION

Figure 1:
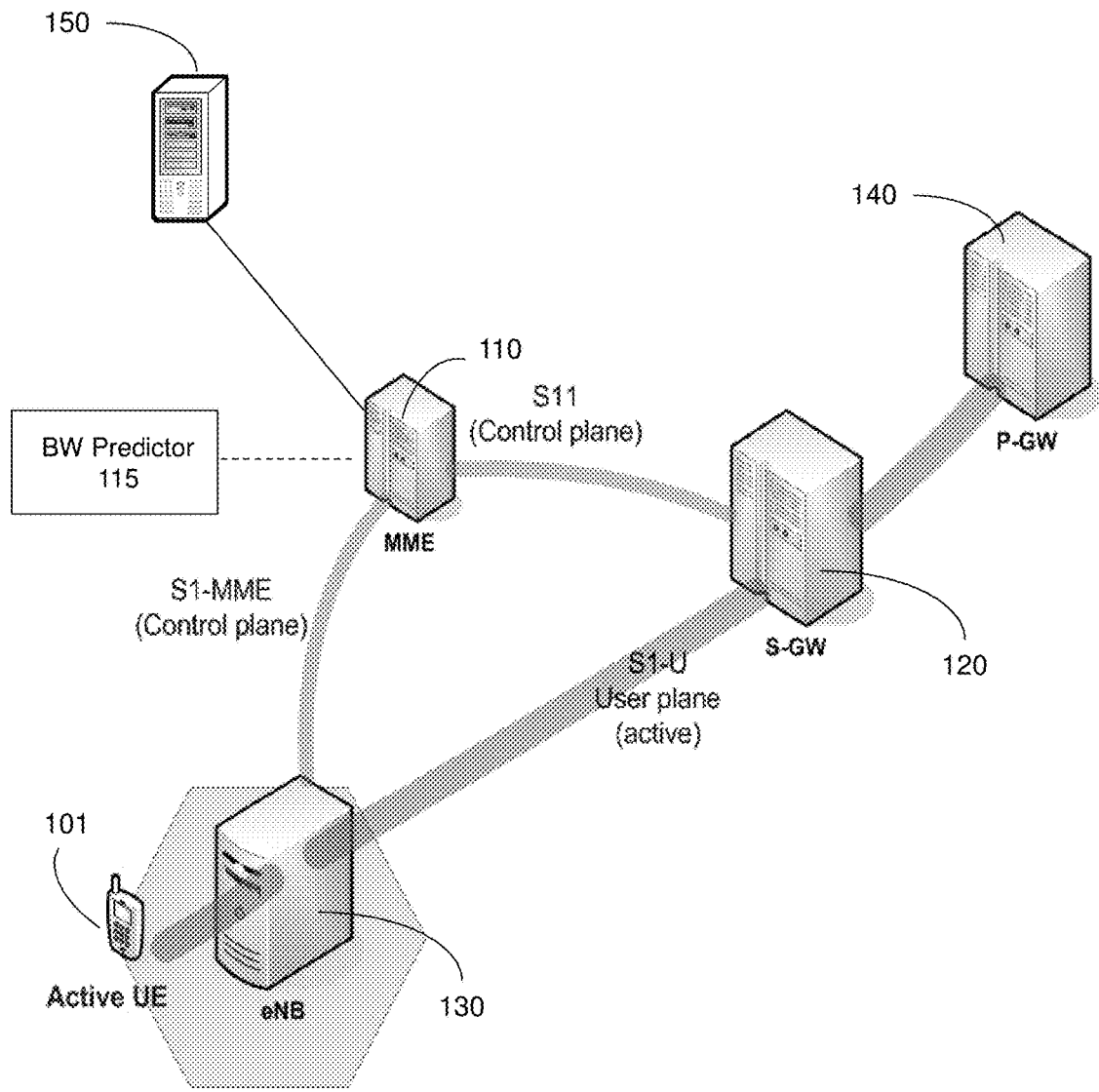
FIG. 1 depicts an illustrative embodiment of a system that provides communication services including video streaming.

The subject disclosure describes, among other things, illustrative embodiments for dynamically adjusting bit rates during streaming of content, where the adjustments are based on predicted available bandwidth for the end user device. Other embodiments are described in the subject disclosure.

One or more aspects of the subject disclosure include systems and methods that provide for utilizing information used by video adaptation processes along with available network bandwidth to manage streaming of content to end user devices. The content can be video content, such as movies, video conferences, and so forth. The management of the streaming process can include dynamically adjusting bit rates during the streaming. In one embodiment, the adaptation process performed by a video client can determine a video quality for each chunk of content. For example, the adaptation process can obtain more accurate estimations of available bandwidth for an end user device by relying upon a prediction of available bandwidth over a future time period that is based on a network service provider's monitoring of network conditions. The available bandwidth predictions can then be utilized for adjusting bit rates during the streaming of content over a network (e.g., a cellular wireless network) to an end user device.

One or more of the exemplary embodiments can shift the task of bandwidth estimation from the client to the network service provider. As an example, the network service provider (e.g., through an Application Programming Interface (API)) can provide a client's media player with a prediction of bandwidth available to that client for a future time duration (e.g., seconds). A network service provider can have a global view of all traffic that is flowing through their network, which may include information such as an end users' signal strength, wireless channel quality, number of active users, users' mobility patterns, and so forth. Further, the network service provider can know how different middle-boxes in the network will affect an end user device's traffic flow and will know of different priority treatments applicable to the end user device's traffic. By having visibility of competing flows inside the network, the network service provider can more accurately predict each end user device's bandwidth for a future time period as compared to bandwidth estimations made by a client (e.g. a media player and/or a content provider) that has limited, if any, network condition information. For instance, the network service provider can predict, using this information, how a scheduler operating inside a base station would rank the end user device's traffic and how much cellular resources would be allocated for that end user device, which can translate into available bandwidth for the end user device.

One or more of the exemplary embodiments utilize dynamic bit rate adjustment during content streaming based on predicted available bandwidth for the end user device which can be more desirable than less accurate predictions of bandwidth such as based on historical throughput. In wireless networks (e.g., cellular networks), historical-based estimates can vary significantly. There are many factors, including the end user device's signal strength, number of users in the cell, the congestion in the cell, and end user device mobility that can determine an end user device's bandwidth. As a result, an end user device's bandwidth can vary widely even over short periods of time, rendering any historical estimates as potentially inaccurate.

One embodiment of the subject disclosure includes a machine-readable storage medium, comprising executable instructions that, when executed by a processor, facilitate performance of operations, including obtaining a predicted available bandwidth for an end user device. The processor can determine a buffer occupancy threshold for the end user device and determine a buffer occupancy of the end user device. The processor can compare the buffer occupancy with the buffer threshold and determine a video bit rate for a portion of media content according to the predicted available bandwidth for the end user device and according to the comparing of the buffer occupancy with the buffer threshold. The video bit rate can be applied during streaming of the portion of the media content to the end user device over a wireless network.

One embodiment of the subject disclosure is a method that includes obtaining, by a system including a network server, first performance data associated with an end user device and second performance data associated with a cell of a wireless network in which the end user device is operating, where the first performance data includes channel quality indicator data, reference signal received quality data or a combination thereof, and where the second performance data includes cell congestion data. The method includes determining, by the system, a predicted available bandwidth for the end user device according to the first and second performance data. The method includes receiving, by the system from a processor, a request for the predicted available bandwidth for the end user device. The method includes providing, by the system to the processor, the predicted available bandwidth for the end user device to cause a video bit rate to be determined for a portion of media content according to the predicted available bandwidth for the end user device and according to a comparison of a buffer occupancy of the end user device with a buffer threshold for the end user device. The method includes facilitating, by the system over the wireless network, streaming of the portion of the media content to the end user device utilizing the video bit rate.

One embodiment of the subject disclosure includes a system having a processor and a memory that stores executable instructions that, when executed by the processor, facilitate performance of operations. The processor can obtain predicted available bandwidths for an end user device and monitor buffer occupancy of a buffer of the end user device. The processor can determine bit rates for portions of media content according to the predicted available bandwidths and according to the buffer occupancy. The processor can adjust bit rates for portions of media content according to the predicted available bandwidths and according to the buffer occupancy during streaming of the media content to the end user device.

FIG. 1 depicts an illustrative embodiment of a communication system 100 that provides communication services to communication devices (e.g., end user device 101), including wireless communication services. The end user devices 101 can be various types of devices, including mobile phones, tablets, laptop computers, desktop computers, set top boxes, personal digital assistants, vehicle navigation systems, and so forth.

System 100 enables efficient streaming and presentation of content despite unique characteristics of cellular networks, such as bandwidth un-predictability over short periods of time due to handover or fading effects. In one embodiment, system 100 can deliver the content to one or more end user devices 101 utilizing various delivery processes including end-to-end video streaming such as adaptive bit rate streaming. The adaptive bit rate streaming can use an encoder which can encode a single source video at multiple bit rates. The player client can adjust between streaming the different encodings depending on available resources. In one embodiment, the streaming client can be made aware of the available streams at differing bit rates and segments of the streams by a manifest file.

The adaptive bit rate streaming can be of various types including HTTP Live Streaming (HLS) and Dynamic Adaptation Streaming over Hypertext Transfer Protocol (DASH). For example, system 100 can employ DASH streaming which uses chunk-based downloading and adjusting of streaming bit rates. The streaming bit rates can be adjusted based on various factors including predicted available bandwidth for the end user device 101, monitored buffer capacity, and/or play progress. In video streaming, DASH can enable stitching chunks of the content together to provide a continuous playback by the end user device 101.

System 100 can overcome inefficiencies in streaming due to conservative bandwidth estimations and/or video quality oscillation by obtaining knowledge of the network conditions from the network service provider, which can include low layer connection information such as signal information that is generally difficult to access from the application layer without root access. The network conditions can be detailed data that enables a more accurate prediction as compared to other processes, such as those that rely on only historical data.

In one embodiment, system 100 can enable a network service provider (e.g., a cellular network service provider), which has much better knowledge of the connection conditions for the clients via its own monitoring, to selectively share network conditions and/or a predicted available bandwidth (for a particular end user device 101) that is determined from those network conditions. The sharing of this information, including conditions along the last mile which can, in some instances, become a bottleneck, enables dynamically adapting bit rates to more efficiently stream the content to the end user device 101.

In one embodiment, cellular network service providers can also determine the number of active users in each cell and associated with the packet scheduling system, thus allowing better predictions in terms of available bandwidth. Statistics for the cells, such as radio information and base station utilization, can be readily available to the cellular network service provider and are often already being collected by the network service providers such as for other purposes, including resource allocation, handovers, and so forth.

In one embodiment, system 100 allows for the network service provider to selectively share limited information with the content provider (e.g., a video streaming service) for adjusting bit rates during delivery of content over a wireless network of the network service provider. For example, the network service provider can selectively allow access, by the content provider, to a predicted available bandwidth for an end user device 101, and the content provider can then adjust the streaming service decision based on the predicted available bandwidth. The predicted available bandwidth can be for a future time period, such as for the next several seconds, although other time windows of bandwidth prediction can be utilized. By doing so, the video streaming service can achieve higher quality while reducing the amount of chunk prefetching, and thus save data budget and power consumption. The network service provider can also benefit from less bursty traffic and can avoid or reduce excessive queuing delay from flow pacing. System 100 can provide a scalable architecture to compute and expose predicted available bandwidths (e.g., for individual end user devices) to content providers in real-time or on the fly, such as inserting the data in packet headers, providing an API that enables selective access to detailed network conditions, and so forth.

System 100, via selectively sharing network conditions and/or predicted available bandwidth for the end user device 101, can also overcome the lack of application knowledge of the network service provider, such as knowledge of the client video buffer occupancy which would lead to re-buffering interruption in the presentation or stalls upon buffer drain due to too high of a bit rate being selected. In one embodiment, the selective sharing by the network service provider with the content provider to allow the content provider to make the video streaming decisions (e.g., adjusting of the video bit rate during the streaming) enables system 100 to overcome different users applying different subscription policies with respect to video quality.

In one embodiment, the selective sharing of information can include the network service provider providing the content provider with access to the predicted available bandwidth without providing access to more detailed data of the network conditions (e.g., channel quality indicator data, throughput data, and so forth). In one embodiment, the content provider can dynamically adjust bit rates during streaming of content based on predicted available bandwidths for the end user device without sharing user information with the network service provider. System 100 can efficiently deliver content with high quality by dynamically adjusting bit rates without modification of packet scheduling systems of the network service provider.

System 100 can include various network elements including Mobility Management Entity (MME) 110, Serving Gateway (SGW) 120, eNodeB (eNB) 130, and Packet Data Network Gateway (PGW) 140. Various other devices can also be utilized to facilitate establishing communications for the communication devices, including servers, routers, switches and so forth. The MME 110 can provide for paging and tagging procedures including re-transmissions, as well as the bearer activation/deactivation process and selecting the SGW 120 for the end user device 101. The MME 110 can perform other functions for a wireless communication session, such as authentication (via a Home Subscriber Server) allocating temporary identities to the end user device 101, and the control plane function for mobility between different access networks.

The SGW 120 can route user data packets, and be a mobility anchor for the user plane during eNB handovers and for mobility between different access technologies. The SGW 120 can trigger paging when downlink data arrives for the end user device 101 and can manage parameters of the IP bearer service and network internal routing information.

The PGW 140 can provide connectivity from the end user device 101 to external packet data networks. End user device 101 can have simultaneous connectivity with more than one POW 140. The PGW 140 can perform policy enforcement, packet filtering, charging support and/or packet screening. The PGW 140 can be an anchor for mobility between 3GPP and non-3GPP technologies.

In one embodiment, system 100 can include a bandwidth predictor 115 which can be a separate device, such as a network server, or can be resident on another network element, such as a server(s) hosting the MME 110. The bandwidth predictor 115 can obtain performance data associated with end user device 101 and/or associated with a network cell(s) in which the end user device is operating or neighboring. For example, the performance data can include Channel Quality Indicator (CQI) data, Reference Signal Received Quality (RSRQ) data, cell congestion data, cell or end user device throughput, number of active users in a cell, available resources associated with a cell, and/or user's queue size. Other performance data can also be monitored, which can be data associated with the particular end user device 101 and/or data associated with the network including the cell and/or neighboring cells. The bandwidth predictor 115 can receive the performance data directly, such as from the eNBs 130 and/or can receive it from other network elements, such as intermediate network servers that collect performance data from the eNBs. The bandwidth predictor 115 can monitor the performance data for various end user devices 101 that are active in the network.

In one embodiment, the mobility of the end user device 101 can be monitored. For example, mobility data associated with the end user device 101 can be obtained. A mobility pattern for the end user device 101 can be determined according to the mobility data and the predicted available bandwidth can be determined in part according to the mobility pattern of the end user device. For example, the mobility pattern can be utilized as a predictor for future mobility of the end user device that can affect the network conditions, such as through a handover requirement. In one embodiment, the bandwidth predictor 115 can obtain performance data by collecting data from the eNB 130 servicing the end user device 101 and/or other eNBs of the network.

The bandwidth predictor 115 can predict an available bandwidth for the end user device 101 according to the performance data (or a portion thereof) and/or the device mobility. The available bandwidth for the end user device 101 can be predicted over a future time period or window, such as a few seconds or over a time period corresponding to a portion of content (e.g., single chunk) to be streamed. The particular time period of the prediction can vary and can include a window that is less than a length of the content being streamed (e.g., less than the duration of a movie). In one embodiment, the bandwidth predictor 115 can continue monitoring performance data and/or the device mobility, and can generate predictions for available bandwidth for end user devices 101 in the network. In another embodiment, the bandwidth predictor 115 can generate predictions for available bandwidth for an end user device 101 in response to a request to do so, such as from the end user device 101 and/or from a streaming server 150 that streams content, such as video content, to the end user device 101.

In one embodiment, the predicted available bandwidth for the end user device 101 can be obtained or otherwise accessed by a video application to cause a video bit rate to be determined for a portion of media content to be streamed to the end user device. Other factors can be utilized in determining the video bit rate including a comparison of a buffer occupancy of the end user device 101 with a buffer threshold for the end user device so as to avoid buffer exhaustion or depletion resulting in an interruption in the presentation of the media content by the end user device. The streaming server 150 can stream the media content by applying the determined video bit rate for the particular portion of the media content. The size of the portion of media content that utilizes the determined video bit rate can vary. For instance in one embodiment, the determined video bit rate can be applied to a chunk of media content being streamed according to DASH. Another video bit rate can then be determined for the next chunk of media content according to a subsequent predicted available bandwidth for the end user device 101 (as well as any other facts being utilized such as monitoring of the buffer occupancy of the end user device). This process of accessing predicted available bandwidths for the end user device 101, monitoring the buffer occupancy of the end user device and then dynamically adjusting the video bit rate of the media content being streamed to the end user device can be repeated and continued until the media content streaming is completed.

In one embodiment, the obtaining of the predicted available bandwidth for the end user device 101 can be via an API provided by the network service provider managing the bandwidth predictor 115. For example, the network service provider can establish an API that enables video clients to selectively access all or some of the detailed network conditions. In one embodiment, the obtaining of the predicted available bandwidth for the end user device 101 can be a selective process that requires authentication of the requesting party. For example, a requesting party can be a content provider that has agreed to limited access to the predicted available bandwidth data for the end user device, including not sharing the data with other parties. In one embodiment, the predicted available bandwidth can be protected data that prevents sharing and/or recording of the data by the content provider (or other party requesting access to the predicted available bandwidth data). For example, the protected data can include restrictions embedded therein that prevents further distribution. The monitoring of the end user device 101, such as by the streaming server 150, can be performed in various ways, including requesting buffer occupancy information directly from the end user device 101.

In one embodiment, system 100 can provide for integration of selective access to network performance information (e.g., predicted available bandwidth) with a client-driven adaptation process, such as in DASH streaming. The network performance information can be made available to the client (e.g., video application), which can use it as a part of its adaptation logic, and/or can share with a content server.

In one embodiment, the process of generating and exposing the predicted available bandwidth can start at the base station (e.g., eNB 130), where cell load, signal statistics and user throughput are collected. Based on the collected data, predicted throughput can be generated for all users and reported to the bandwidth predictor 115, such as once per reporting interval. The bandwidth predictor 115 can store this predicted available bandwidth, which can be queried by clients. As an example, the clients can be HTTP-based and the bandwidth predictor 115 can use an HTTP-based API. Depending on requirements, clients can query the network state for the current or past reporting periods. The bandwidth predictor 115 can further process information received by base stations, such as to produce aggregated or long-term predictions. As an example, if base stations report every 500 ms, then the bandwidth predictor 115 may construct a prediction for 2, 5, or any number of seconds. This may depend on the frequency that the clients may query the bandwidth predictor 115.

In one embodiment in an application- or service-specific scenario, only certain applications or services may be permitted to query the bandwidth predictor 115. In another embodiment, all mobile clients can have access to the predicted available bandwidth (e.g., limited to the particular end user device streaming the content). In a client-oriented architecture, the bandwidth predictor 115 can be located inside the cellular core network and queried by a video application via HTTP. The prediction delivered by the bandwidth predictor 115 can be valid for the next several seconds, such as on the order of a video chunk duration. In one embodiment, each response may include information on how often clients may issue queries and for how long the returned prediction is valid.

Multiple forms of media services can be offered via system 100 to media devices over landline and/or wireless technologies. System 100 can operate according to various wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 2:
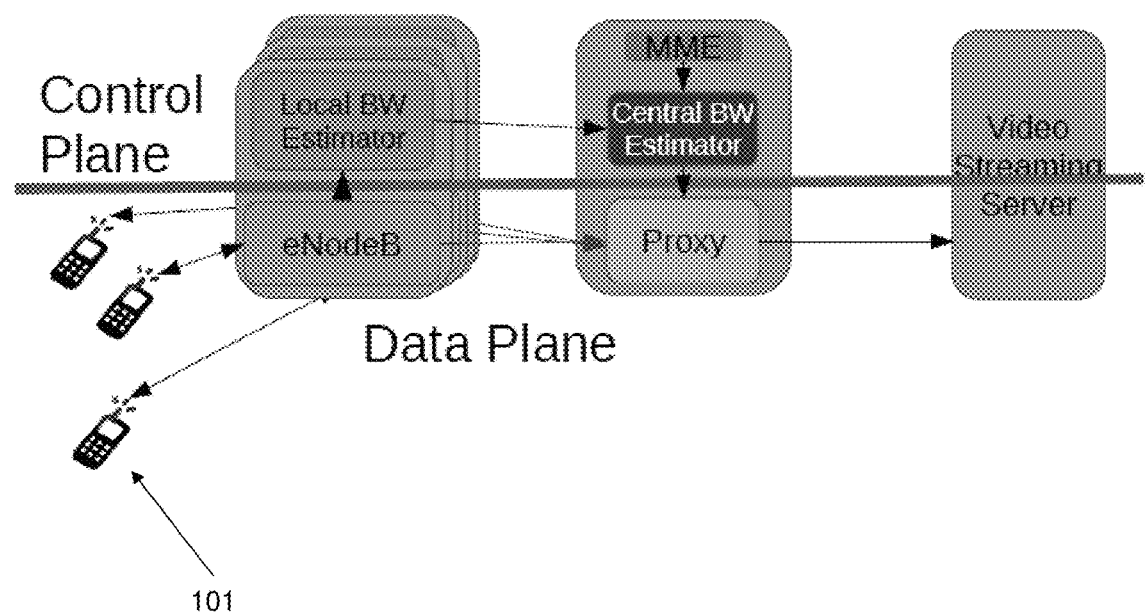
FIG. 2 depicts another illustrative embodiment of a system that provides communication services including video streaming.

FIG. 2 depicts an illustrative embodiment depicting a system 200 that enables predicting available bandwidth for one or more end user devices 101. The particular architecture shown is illustrative and other architectures can also be implemented, including centralized or distributed systems. In system 200, a two-tiered system is being utilized. A proxy can be placed in the data plane, and local and central bandwidth estimators can be placed in the control plane. For example, the local bandwidth estimator can communicate with eNBs to obtain first performance data such as channel quality, number of active users, cell load, users' queue size, and so forth. This first performance data can then be utilized for computing a preliminary available bandwidth for the end user device(s). The local bandwidth estimator can be logically distributed in the Radio Access Network (RAN) which enables it to be scaled-out more easily.

In this example, a central bandwidth estimator can be positioned in the core network. The central bandwidth estimator can receive and analyze the preliminary bandwidth estimations from the local bandwidth estimator(s), in conjunction with second performance data, such as MME mobility information, to compute the final bandwidth prediction for the end user device. In some instances, a single local estimation can be utilized to determine the final estimation, and in other instances, such as when a handover is occurring, several local estimations can be utilized in the analysis. In this example, the central bandwidth estimator can be scaled-out with MMEs in the network. System 200 can be utilized with various network architectures, including 3G and 4G networks. Once the computation work is finished, the central bandwidth estimator sends the predicted available bandwidth to the proxy which can selectively allow access to the predicted available bandwidth by third parties such as by a content provider (e.g., via an API accessed by a video streaming server).

System 200 enables determining predicted available bandwidth for any number of end user devices 101 according to various network performance data. The predicted available bandwidth data can then be selectively accessed to enable dynamic adjustment of bit rates utilized in streaming media content to a corresponding one of the end user devices. The prediction windows can be of various sizes (e.g., a few seconds) and the adjustments to the bit rates can be applied to various sizes of portions of the media content, such as adjustments to bit rates for each or several chunks of the media content being streamed according to DASH.

Figure 3:
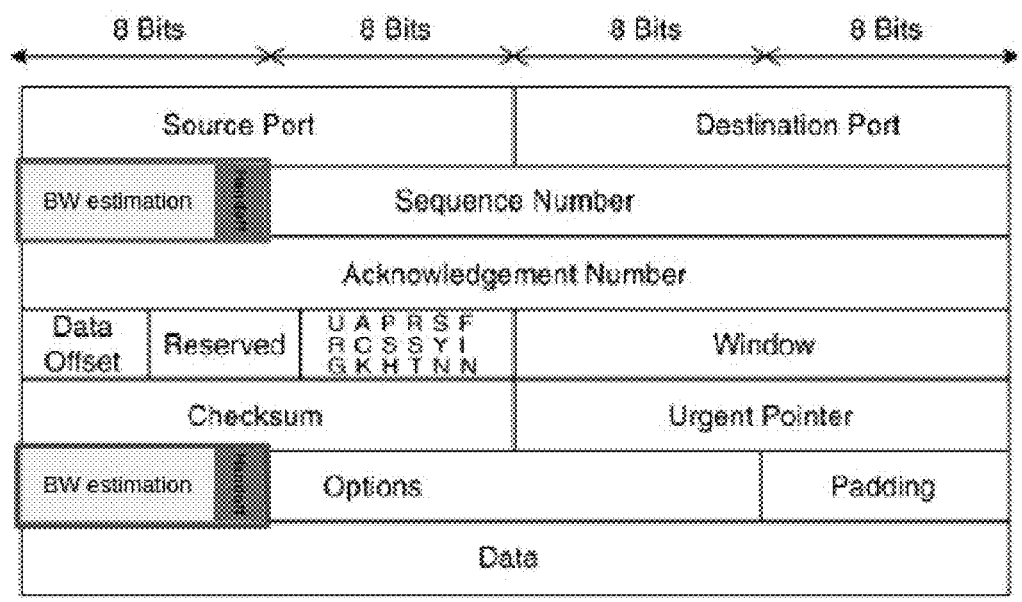
FIG. 3 depicts an illustrative embodiment of a datagram that can be used for exposing key performance indicators including predicted available bandwidth.

FIG. 3 illustrates a datagram 300 that enables exposing Key Performance Indicators (KPIs) (e.g., predicted available bandwidth) to a party other than the network service provider (e.g., to a content provider). By enabling access to this information, other parties, such as associated with video clients, can improve communication services, including adaptive bit rate streaming of media content. The exposed KPIs can be limited to the predicted available bandwidth (with or without the performance data used for the calculation) or can include other information that facilitates streaming of the media content. In this example, the predicted available bandwidth can be encoded in either or both of the option field and sequence number. Cellular networks can deploy proxies in the core network for pacing purposes where the proxy splits the TCP connection into two: the server communicating with the proxy and the proxy communicating with the client. By exposing the KPIs via the proxy to the server, security can be more robust and network congestion can be reduced. The downstream link carries a majority of the traffic, while the upstream link has only a small fraction of the traffic for feedback data. The server may send the KPIs back to the client's video play application.

Enabling access to the KPIs (e.g., predicted available bandwidth) via an inline method rather than a new connection does not result in doubling the number of connections between the server and the proxy, and also provides the video streaming connection and metric exposure connection being directed to different private servers in a CDN load balancer.

In one embodiment, the KPIs (e.g., the predicted available bandwidth) can be encoded in the sequence number field. Since the sequence number field has thirty-two bits, eight bits can be reserved for the KPI exposure. For instance, seven bits can be utilized for a floating number and one bit for a handover. As an example, seven bits can be divided into integer and fractional parts, three bits for integer and four bits for fractional, providing a precision of 0.063 Mbps and a maximum value of 8.94 Mbps, which is sufficient for video streaming bit rate selection with a range between 0.2 to 4 Mbps. At the same time, these seven bits can still support 16 million packets before wrapping around. Also, enabling access to the KPIs (e.g., predicted available bandwidth) via the sequence number, rather than a TCP option field, can avoid any middle-boxes on the Internet modifying or dropping the option field.

Figure 4:
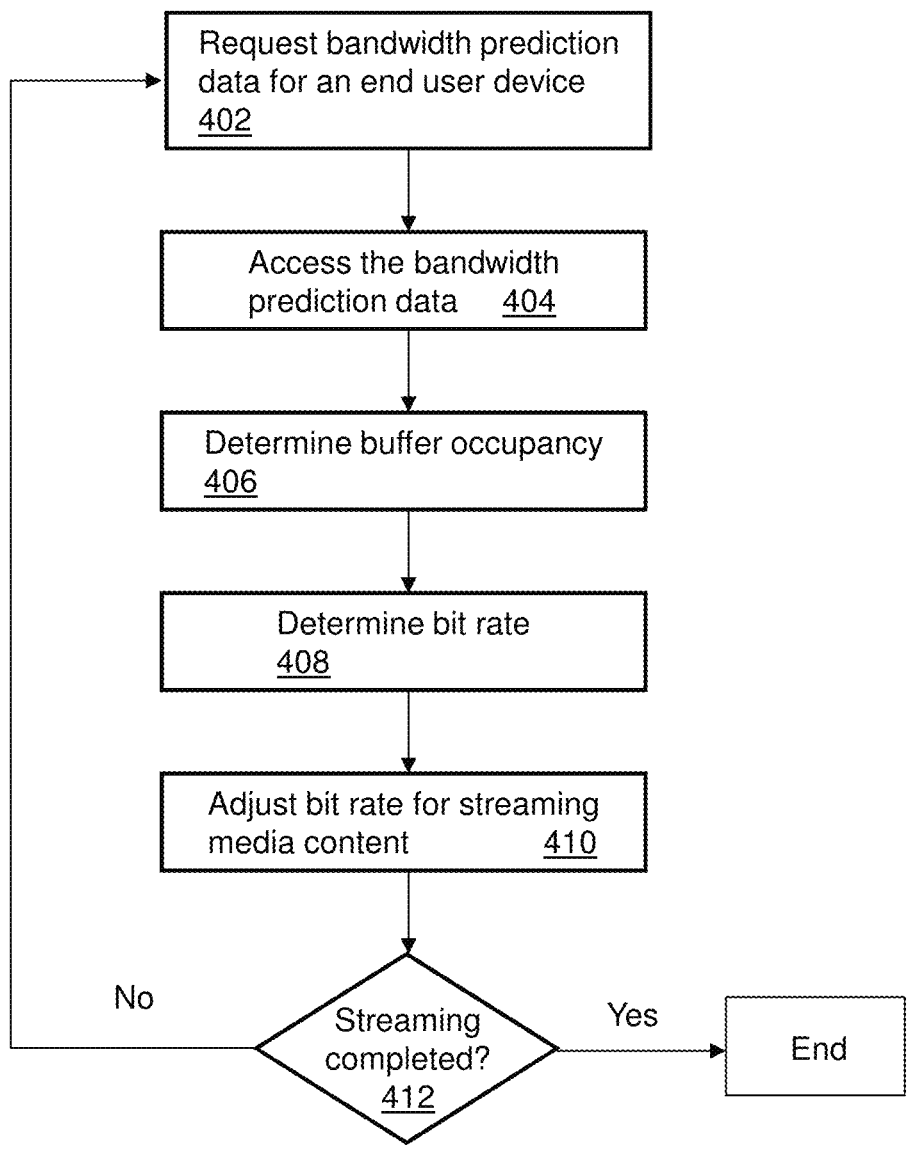
FIG. 4 depicts an illustrative embodiment of a method used in portions of the systems described in FIGS. 1-2.

FIG. 4 depicts an illustrative embodiment of a method 400 used by systems 100 and/or 200 for providing adaptive bit rate streaming of content to end user devices where pre-dicted available bandwidth is utilized for determining the bit rates. At 402, a request for predicted available bandwidth for an end user device can be transmitted to a network server, such as bandwidth predictor 115. The request can be transmitted by the end user device 101 and/or the streaming server 150. At 404, the predicted available bandwidth for the end user device 101 can be obtained, such as accessing the predicted available bandwidth via an API of the bandwidth predictor 115. In one embodiment, the information accessible can be limited to the predicted available bandwidth without accessing network performance data from which the predicted available bandwidth was calculated.

At 406, the buffer occupancy of a buffer of the end user device can be monitored or otherwise determined. For example, the buffer occupancy can be determined and compared to a buffer threshold to identify whether the buffer occupancy is in a first zone which has a higher likelihood of buffer drain as compared to a second zone which has a lower likelihood of buffer drain. The threshold can be determined based on various factors including the total buffer capacity, the type of media content, and so forth.

At 408, a bit rate for a portion of media content to be streamed over a network (e.g., a wireless cellular network) to the end user device 101 can be determined according to the predicted available bandwidth and according to the buffer occupancy. As an example, the media content can be streamed to the end user device 101 utilizing an adaptive bitrate streaming process (e.g., DASH, HLS, and so forth). The determined bite rate can be applied at 410 during the streaming process. A determination as to whether all of the media content has been streamed to the end user device can be made at 412. If additional portions of the media content (e.g., more chunks of media content) need to be streamed to the end user device, then method 400 can return to 402 to request a subsequent bandwidth prediction and method 400 can be repeated so that another bit rate adjustment can be made for a subsequent portion of the media content to be streamed to the end user device. The method 400 can continue until the entire media content has been streamed to the end user device.

In one embodiment, the accessing of the predicted available bandwidth can include an authentication of the requestor. In another embodiment, the predicted available bandwidth can be determined according to channel quality indicator data associated with the end user device, reference signal received quality data associated with the end user device, cell congestion data associated with a cell of the wireless network in which the end user device is operating, a mobility pattern of the end user device, or a combination thereof.

In one embodiment, the determining of the bit rate for the portion of the media content to be streamed can include selecting a reference bit rate according to comparing a buffer occupancy of the end user device with a buffer threshold, determining a second bit rate applied during streaming of a previous portion of the media content to the end user device, and comparing the reference bit rate with the second bit rate. In another embodiment, the obtaining of the predicted available bandwidth can include accessing bandwidth data from a network server of a wireless network via an API.

Referring to FIGS. 5-7, a collection of network traces from a cellular service provider show the predictability of some KPIs that can affect available throughput. The traces were collected for five minutes in June 2014 from several locations in the United States. The data covers more than a half-million users distributed over two thousand eNBs. In this example, the prediction accuracy is determined using standard statistical tools such as Mean Absolute Percentage Error (MAPE) and Mean Square Percentage Error (MSPE). Cumulative Forecast Error (CFE) is also utilized to indicate how the prediction deviates over a long duration.

Cellular networks can have high mobility which causes link quality to fluctuate. In one embodiment, Channel Quality Index (CQI) can be utilized where the CQI is reported by the end user device to inform the eNB about its signal quality. As an example, CQI can range from 0 through 15 where the higher CQI indicates a higher modulation and coding scheme and a higher throughput. Reference Signal Received Quality (RSRQ) can also be utilized which is a metric for an LTE wireless channel. RSRQ can sense the load from other users in the same cell and the neighboring cells, and can be indexed in 0-34 integer numbers where a higher number indicates a better link quality. Future RSRQ can be predicted using time series analysis. For example, an Auto-Regressive Integrated Moving Average (ARIMA) model can be implemented to predict the next second: the algorithm can fit the best ARIMA with historical data, and it can use a sliding window as the training dataset. As an example, the window size can be set to 15 s.

In one example, by replaying 113 sample traces where all the end user devices are active for more than 100 seconds, an MAPE<0:18 was obtained with a mean of 0:064. CFE values in this example vary more across users with a maximum CFE=34.6, which is about three times of a unit value. In other words, for 100 seconds of prediction look-ahead, the prediction result is 97% accurate over a long term and 82% accurate on average. This indicates that a prediction model, such as based on ARIMA, can offer fairly accurate prediction.

In this example, the number of active users in each cell was measured from the same trace as described above. The trace was collected from RSRQ reports from end user devices to eNBs. A user was assumed to be active in a certain second if the user reports RSRQ in a one-second interval. The ARIMA model was then applied in this example, and a determination as made that in most cases a random-walk model fits best. Different cells have different loads, and the prediction was more accurate in a heavily loaded cell. In a proportional fair scheduler, over the long term, the bandwidth each user receives can be proportional to the inverse value of the number of users, so the inverse value was taken to compute the MAPE. For heavily loaded cells (>30 end user devices), the MAPE<0:1; while for medium loaded cells (5-30 UEs), the MAPE<0:3. This indicated that 70% accuracy was achieved for each prediction on average for a medium to heavily loaded cell.

Referring to FIGS. 8-9, a video rate selection process 900 can be implemented that utilizes a prediction of available future bandwidth for an end user device that will be streamed the content. The process can utilize various parameters which are shown in FIG. 8. Process 900 seeks to improve or optimize performance metrics for video streaming services including quality, stability and interruption/rebuffering. In one embodiment, since the video download is chunk-based, a video session can consist of chunks with different qualities (bit rates). The video player can download the chunk with the highest possible quality based on available bandwidth at each download point. Quality can be defined as the ratio of 'total size of downloaded and played video' and 'sum of bandwidth.' From a viewer's perspective, frequent rate switches can be distracting and undesirable. One goal of process 900 is to reduce or minimize instability, defined as the number of rate switches between consecutive chunks, $\Phi = \Sigma_t 1(R^t! = R^{t-1})$, where 1 is an indicator function. It is intended by process 900 that video play not be halted for rebuffering video chunks, otherwise user experience will be degraded. Video play interruptions affect the user engagement and results in early abandonment of the video play. Process 900 can minimize the number of interruptions over the entire session.

For evaluating process 900, an offline algorithm, OPT, was created that received available bandwidth during the entire session as an input and selects video quality for each chunk. The performance of the OPT algorithm forms an upper bound on possible gains from knowledge of future bandwidth. Given the available bandwidth for the entire video play session, optimal video rates for each chunk can be determined. A Mixed Integer Linear Program (MILP) can be formulated with the goal of maximizing quality without causing any interruptions. When implementing process 900, chunks are needed ahead of their actual playing time including requiring one chunk before starting the video presentation.

Utilizing a first rate selection algorithm, to ensure no interruptions, at each chunk, the total download should not exceed the sum of capacities until that video chunk:

The dowload at time t is given by Download = $\sum_{i=1}^{M} R_i * x_i^t$. The zero-interruptions constraint is $\sum_{t=1}^{\tau}\left(\sum_{i=1}^{M} R_i * x_i^t\right) \le \sum_{t=1}^{\tau} C^t$ for $\forall \tau \in \{1, ..., T\}$. As stated earlier, quality (play efficiency) is the overall utilization of the available bandwidth over time period [1:T], defined as $$E = \frac{\sum_{t=1}^{\tau}\left(\sum_{i=1}^{M} R_i * x_i^t\right)}{\sum_{t=1}^{\tau} C^t}.$$ The MILP for maximizing quality without causing interruption is
MAXIMIZE E
SUBJECT TO $$\forall \tau \in \{1, ..., T\}, \sum_{t=1}^{\tau}\left(\sum_{i=1}^{M} R_i * x_i^t\right) \le \sum_{t=1}^{\tau} C^t$$

$$\forall t, \sum_{i=1}^{M} x_i^t = 1$$

$$\forall t, i, x_i^t = \{0, 1\}$$

Process 900 can select a video rate for each chunk based on predictions of available bandwidth in the near future. Process 900 can use the predicted bandwidth for the next video chunk interval to compute a reference play bit rate, and can use this referred bandwidth, play history and buffer occupancy to make a final decision. In one embodiment, process 900 knows the available bandwidth forecast for a small time interval, such as for the next chunk. Process 900 can be a joint optimization solution based on both the video buffer occupancy and the predicted bandwidth. In deriving process 900, the algorithm can be motivated with a naive solution: pick the maximum play bit rate that can be supported by the known future bandwidth. The stability may be impacted due to highly variable bandwidth values, and because all of the bandwidth for maximizing quality of the video is being utilized, there is a good chance that the playout buffer will not have many chunks.

Connection loss (e.g., zero or near zero bandwidth) of several seconds can occur in cellular networks and these may drain out the buffer and result in video interruption and re-buffering. To avoid this, the buffer can be categorized or otherwise divided into multiple zones such as two zones—risky and safe—based on buffer occupancy threshold $B_{risk}$. Other numbers of zones can be used such as three zones such as safe, transient and risky as described below in "Can Accurate Predictions Improve Video Streaming In Cellular Networks."

As an example, in the risky zone, a low buffer occupancy exists and a high chance of buffer over-drain. An attempt to build up the buffer can be employed by picking one rate lower than what the available bandwidth can support. For example, if the bandwidth is 0:58 Mbps and the two closest video bit rates are 0:56 and 0:375, 0:375 can be chosen as an ideal bit rate for the bandwidth in the risky zone in order to fill in the client buffer to safe phase faster. In the safe zone, the highest available bit rate can be selected which is 0:56 Mbps in this example. This computed bit rate can be the reference bit rate, Rref. Process 900 considers the stability in the following manner: it compares the reference bit rate and current bit rate (e.g., bit rate applied to previous streaming), and chooses the reference or current bandwidth or a play bit rate between them based on a certain criteria. Process 900 can use delayed updates based on the buffer occupancy status. At a high level, process 900 attempts to stay at Rcur, unless either the bandwidth and recent buffer gains cannot sustain that play bit rate causing the process 900 to adjust down to lower quality, or the near future bandwidth is higher and recent buffer gains can sustain a potential buffer loss if the bandwidth returns to a current bandwidth in a far future so that the process adjusts up to higher quality.

If Rref<Rcur, since the current play bit rate is higher than available bandwidth, the process 900 can select the current play bit rate at the cost of draining the client video buffer. If the buffer size is in safe zone, the process 900 can take the risk and can adhere to the current play bit rate. If the buffer is in risky zone, the process 900 can compute the possible buffer drain if choosing the current play bit rate BufferLoss=ChunkDuration*(Rcur−C)/C, because it takes ChunkDuration*Rcur/C to finish downloading ChunkDuration seconds of video. The buffer change can be compared in the last k chunks where k is a tunable parameter (k=5 in evaluation), B=Bt−Bt−k+ChunkDuration*k, where Bt represents the buffer occupancy at the end of tth chunk download. If the buffer change in the last k chunks is positive and sufficient to compensate the buffer drain for next one video chunk, the process 900 chooses the current play bit rate, otherwise it chooses the highest bit rate which can suffice this criterion. This step can avoid video presentation interruption while ensuring stability.

Utilizing the first rate selection algorithm, if Rref>Rcur, though the referred play bit rate is higher, the high available bandwidth may be for a short period of time and the process 900 may need to check the buffer gain in the last few chunks against potential buffer loss. In addition to that, if the buffer occupancy is high, the process 900 can be more aggressive and adjust up faster and vice versa. To add this factor, the potential buffer loss is computed for k' chunks where k' is in linear relation to unfilled buffer B'=z−B, k'=α*B'/ChunkDuration, where a is another tunable knob (α=0:15 in the evaluation). A conservative case can be assumed in the future where the network has enough bandwidth to stream at current bit rate with no client buffer loss or gain, so potential BufferLoss=α*B'*(Rref−Rcur)/Rcur. If the value is less than buffer gain, a determination can be made to overdrain the buffer with the new play bit rate. This step can boost stability. The process 900 can continuously predict or otherwise estimate the bandwidth for the next chunk and can select the bit rate and download once a chunk finishes downloading, unless the client buffer is totally full at size z, as shown in FIG. 9. Use of a different algorithm for dynamically selecting of the video bit rate resulted in different results which are described below in "Can Accurate Predictions Improve Video Streaming In Cellular Networks."

Referring to FIGS. 10-13, process 900 was evaluated based on various metrics including quality, stability and interruption (rebuffering). The available bandwidth traces were taken from one major U.S. 4G network carrier and MIT Sprout Project. Wireless channel traces were cut into 5-10 minute long segments, as 80-90% video sessions are shorter than 10 minutes. In total there are four 3G and 12 4G segments. Ten different video encoding rates are taken from one major video streaming carrier: {0:235; 0:375; 0:56 . . . 4:3} Mbps and it was assumed there was no variation in bit rates for each chunk. Two different streaming algorithms were selected for comparison against process 900: FESTIVE and BBA. FESTIVE was selected because its algorithm is designed for the scenario where there are several users sharing a single bottleneck link during video streaming session, which fits the cellular network setting where the wireless channel can be the bottleneck. FESTIVE takes the harmonic mean of bandwidth over the last 20 video chunk downloads as reference and adds randomization into video chunk download scheduling to avoid a synchronized congestion. BBA relies on video buffer occupancy as an implicit feedback of the network condition for video bit rate selection, and uses a proportional relation to the buffer occupancy to compute the desired rate. BBA also has a fast startup phase where it ramps up to a desirable play bit rate based on buffer occupancy growth rate. Throughout the comparison with FESTIVE, the tunable knob was set for stability α=12, bandwidth factor p=1 and recommended buffer size 60 seconds. In BBA, BufferReservoir=90 s, BufferCushion=126 s and max buffer z=240 s. The risky phase Brisk was set to 60 s and max buffer z=240 s, look back chunk size k=5 and =0:15. Each video chunk is 4 seconds, which is a prevalent length for one major video streaming vendor.

Figures 10, 11:
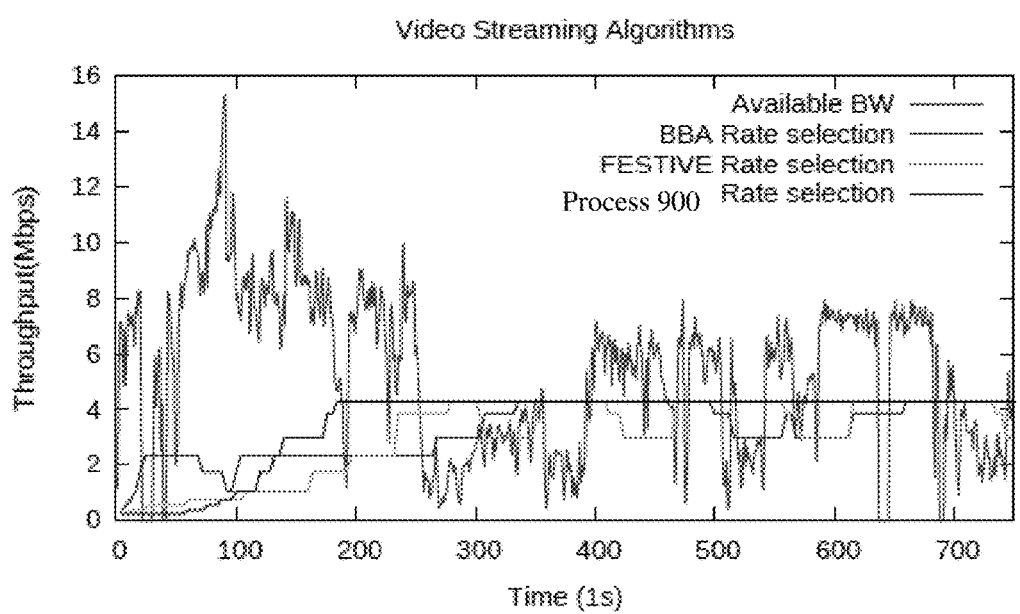
FIGS. 10-13 depict an illustrative embodiment of a comparison between an exemplary bit rate selection process utilizing the first rate selection algorithm and other streaming algorithms.
Figures 12, 13:
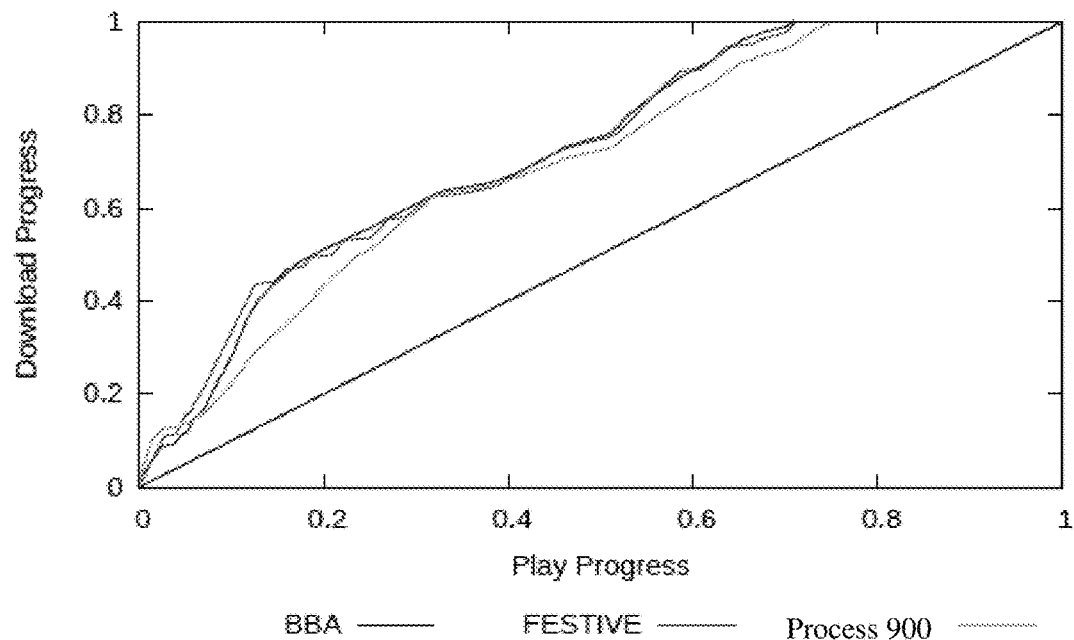

To illustrate the comparison of process 900 of the first rate selection algorithm with FESTIVE and BBA, an "oracle" estimator is utilized which indicates the space of improvement for the metrics being compared: quality (play efficiency), stability and interrupts. As shown in FIG. 10, process 900 outperforms the other two algorithms in all traces in terms of all three metrics except against FESTIVE for stability in two 3G traces. For the traces where FESTIVE achieves higher stability, FESTIVE tends to stay at low play bit rates and thus has much lower quality and link utilization. Further, in these traces, the stability issue is less important: process 900 has 5.5 switches on average while FESTIVE has 3 switches, and in all other traces all algorithms have >6 switches. Prefetched buffer size was also compared between BBA and process 900. FESTIVE is not a client video buffer based solution and only adds randomized scheduling if it reaches a certain buffer level—that buffer level was extended to z=240 s download and there was no difference seen in terms of FESTIVE's efficiency, stability or interruption, since FESTIVE only looks at the past 20 chunks. Comparing to BBA, process 900 has reduced buffer size significantly by 10-40 seconds even though both maximum buffer sizes z=240. One sample trace is illustrated in FIG. 12: ideally the download progress and play progress are on the red line, however due to prefetching the download time is always ahead of play time, or the download line is always above the red line and the gap is the client play buffer size.

For the first rate selection algorithm, a synthetic trace was used to test the properties of fast ramp up and resilience to connection loss. The bandwidth was set to static at 4.3 Mbps to test ramp-up time. 30, 45 and 60 seconds connection outage after 100 seconds 4.3 Mbps bandwidth was added to test resilience. There are zero interruptions in all cases; process 900 and FESTIVE's play bit rates are 4.3 Mbps at the moment, while BBA's is 1.75 Mbps. A difference exists between play time and download time, where FESTIVE takes 260 s play time to get to 4.3 Mbps, but at 100 s download time FESTIVE is downloading video chunk at bit rate 4.3 Mbps, and the gap is due to prefetching. There is a drop to a lower quality in some instances which is illustrated in FIG. 13. Process 900 has a good performance margin in both ramp-up time and resilience to link loss as compared to FESTIVE and BBA.

As a comparison with a theoretical maximum quality, 16 traces were replayed and the results show that process 900 can achieve 84% of the efficiency upper bound described by the MILP algorithm above.

Process 900 also performs well in a noisy prediction scenario. To show this, a synthetic estimator is utilized for prediction and when the prediction is roughly accurate with a certain degree of error rate, process 900 is robust enough to achieve a close-to-optimal performance. A sensitive study for process 900 was conducted with the noisy estimator. The synthetic estimator uses a noisy factor with a distribution of Gauss (1, 0.2) or Uniform (0.5, 1.5) when offering predicted bandwidth. Through repetitive replay, process 900 was determined to achieve about the same performance in all traces, but with around a 10% chance of degradation in stability (1.5× quality switches) in the repetitive replay. Use of a different algorithm for dynamically selecting of the video bit rate resulted in different results which are described below in "Can Accurate Predictions Improve Video Streaming In Cellular Networks."

Figure 14:
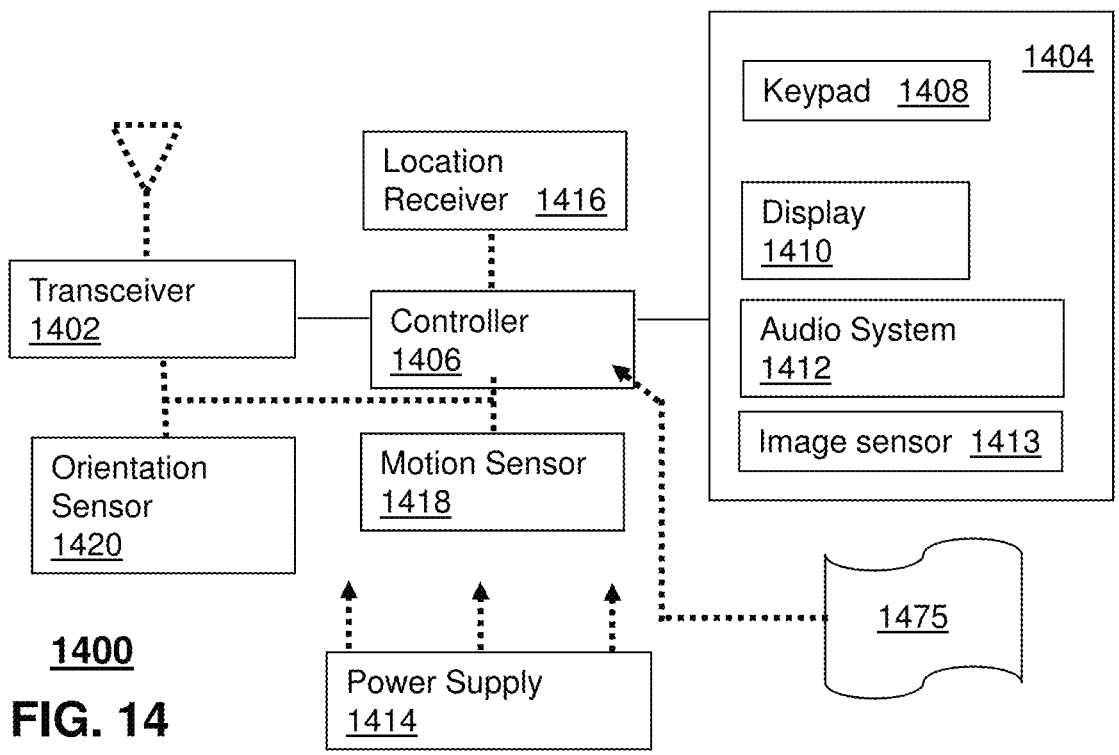
FIG. 14 depicts an illustrative embodiment of a communication device.

FIG. 14 depicts an illustrative embodiment of a communication device 1400. Communication device 1400 can serve in whole or in part as an illustrative embodiment of the devices depicted in systems 100 and 200 and can be configured to perform portions of method 400. As an example, communication device 1400 can obtain a predicted available bandwidth, determine a buffer occupancy threshold, determine a buffer occupancy, compare the buffer occupancy with the buffer threshold, and determine a video bit rate for a portion of media content according to the predicted available bandwidth and according to the comparing of the buffer occupancy with the buffer threshold. The video bit rate can then be applied during streaming of the portion of the media content over a wireless network. This process can be repeated until the streaming of the media content is completed. The predicted available bandwidth can be determined according to channel quality indicator data and/or according to reference signal received quality data. The obtaining of the predicted available bandwidth can include: transmitting a request for the predicted available bandwidth and, responsive to an authentication, receiving the predicted available bandwidth from a network server of the wireless network. The predicted available bandwidth can be determined according to cell congestion data associated with a cell of the wireless network in which the end user device is operating. The predicted available bandwidth can be determined according to a mobility pattern. The predicted available bandwidth can be determined according to prediction information collected by a network server from an eNodeB, where the prediction information includes channel quality, a number of active users, a cell load, and throughput data. The determining of the video bit rate for the portion of the media content can include comparing of the buffer occupancy with the buffer thresholds, determining a current video bit rate applied during streaming of a previous portion of the media content over the wireless network, and predicted available bandwidth.

Communication device 1400 can comprise a wireline and/or wireless transceiver 1402 (herein transceiver 1402), a user interface (UI) 1404, a power supply 1414, a location receiver 1416, a motion sensor 1418, an orientation sensor 1420, and a controller 1406 for managing operations thereof. The transceiver 1402 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 1402 can also be adapted to support circuit-switched wireline access technologies (such as PSTN), packet-switched wireline access technologies (such as TCP/IP, VoIP, etc.), and combinations thereof.

The UI 1404 can include a depressible or touch-sensitive keypad 1408 with a navigation mechanism such as a roller ball, a joystick, a mouse, or a navigation disk for manipulating operations of the communication device 1400. The keypad 1408 can be an integral part of a housing assembly of the communication device 1400 or an independent device operably coupled thereto by a tethered wireline interface (such as a USB cable) or a wireless interface supporting for example Bluetooth®. The keypad 1408 can represent a numeric keypad commonly used by phones, and/or a QWERTY keypad with alphanumeric keys. The UI 1404 can further include a display 1410 such as monochrome or color LCD (Liquid Crystal Display), OLED (Organic Light Emitting Diode) or other suitable display technology for conveying images to an end user of the communication device 1400. In an embodiment where the display 1410 is touch-sensitive, a portion or all of the keypad 1408 can be presented by way of the display 1410 with navigation features.

The display 1410 can use touch screen technology to also serve as a user interface for detecting user input. As a touch screen display, the communication device 1400 can be adapted to present a user interface with graphical user interface (GUI) elements that can be selected by a user with a touch of a finger. The touch screen display 1410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1410 can be an integral part of the housing assembly of the communication device 1400 or an independent device communicatively coupled thereto by a tethered wireline interface (such as a cable) or a wireless interface.

The UI 1404 can also include an audio system 1412 that utilizes audio technology for conveying low volume audio (such as audio heard in proximity of a human ear) and high volume audio (such as speakerphone for hands free operation). The audio system 1412 can further include a microphone for receiving audible signals of an end user. The audio system 1412 can also be used for voice recognition applications. The UI 1404 can further include an image sensor 1413 such as a charged coupled device (CCD) camera for capturing still or moving images.

The power supply 1414 can utilize common power management technologies such as replaceable and rechargeable batteries, supply regulation technologies, and/or charging system technologies for supplying energy to the components of the communication device 1400 to facilitate long-range or short-range portable applications. Alternatively, or in combination, the charging system can utilize external power sources such as DC power supplied over a physical interface such as a USB port or other suitable tethering technologies.

The location receiver 1416 can utilize location technology such as a global positioning system (GPS) receiver capable of assisted GPS for identifying a location of the communication device 1400 based on signals generated by a constellation of GPS satellites, which can be used for facilitating location services such as navigation. The motion sensor 1418 can utilize motion sensing technology such as an accelerometer, a gyroscope, or other suitable motion sensing technology to detect motion of the communication device 1400 in three-dimensional space. The orientation sensor 1420 can utilize orientation sensing technology such as a magnetometer to detect the orientation of the communication device 1400 (north, south, west, and east, as well as combined orientations in degrees, minutes, or other suitable orientation metrics).

The communication device 1400 can use the transceiver 1402 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1400.

Other components not shown in FIG. 14 can be used in one or more embodiments of the subject disclosure. For instance, the communication device 1400 can include a reset button (not shown). The reset button can be used to reset the controller 1406 of the communication device 1400. In yet another embodiment, the communication device 1400 can also include a factory default setting button positioned, for example, below a small hole in a housing assembly of the communication device 1400 to force the communication device 1400 to re-establish factory settings. In this embodiment, a user can use a protruding object such as a pen or paper clip tip to reach into the hole and depress the default setting button. The communication device 1400 can also include a slot for adding or removing an identity module such as a Subscriber Identity Module (SIM) card. SIM cards can be used for identifying subscriber services, executing programs, storing subscriber data, and so forth.

The communication device 1400 as described herein can operate with more or less of the circuit components shown in FIG. 14. These variant embodiments can be used in one or more embodiments of the subject disclosure.

The communication device 1400 can be adapted to perform the functions of the end user device 101, the bandwidth predictor 115, the eNB 130, the server 150, and other devices of system 100, as well as the local bandwidth estimator, the central bandwidth estimator, the proxy and other devices of system 200. It will be appreciated that the communication device 1400 can also represent other devices that can operate in systems 100 and 200 such as a gaming console and a media player. In addition, the controller 1406 can be adapted in various embodiments to perform the functions 1475. Functions 1475 can include collecting various performance data and predicting available bandwidth for end user device(s) over a future time period. Functions 1475 can also include dynamically determining bit rates according to predicted available bandwidth and buffer occupancy.

Upon reviewing the aforementioned embodiments, it would be evident to an artisan with ordinary skill in the art that said embodiments can be modified, reduced, or enhanced without departing from the scope of the claims described below. For example, predicted available bandwidths can be applied to all active end user devices in the network or to a subset of those end user devices, such as based on a subscription plan, an indication that video streaming is desired, a type of content being streamed, present network conditions, and so forth. In one embodiment, the future time period over which the predicted available bandwidth applies can be varied, such as having shorter prediction time periods where larger fluctuations in network conditions are being predicted and having larger prediction time periods where smaller fluctuations in network conditions are being predicted. In another embodiment, the generating of predicted available bandwidths can be performed non-continuously. For instance, a determination can be made that network conditions have changed only a small amount, such as below a threshold for a subset of network metrics being monitored, and based on this determination the previous predicted available bandwidth can be deemed valid for the subsequent future time period.

In another embodiment, the content provider can monitor characteristics of the end user device, such as monitoring the buffer occupancy of the end user device, and can determine the video bit rates for streaming of the content according to the predicted available bandwidth data, as well as according to the monitoring of the end user device. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 15:
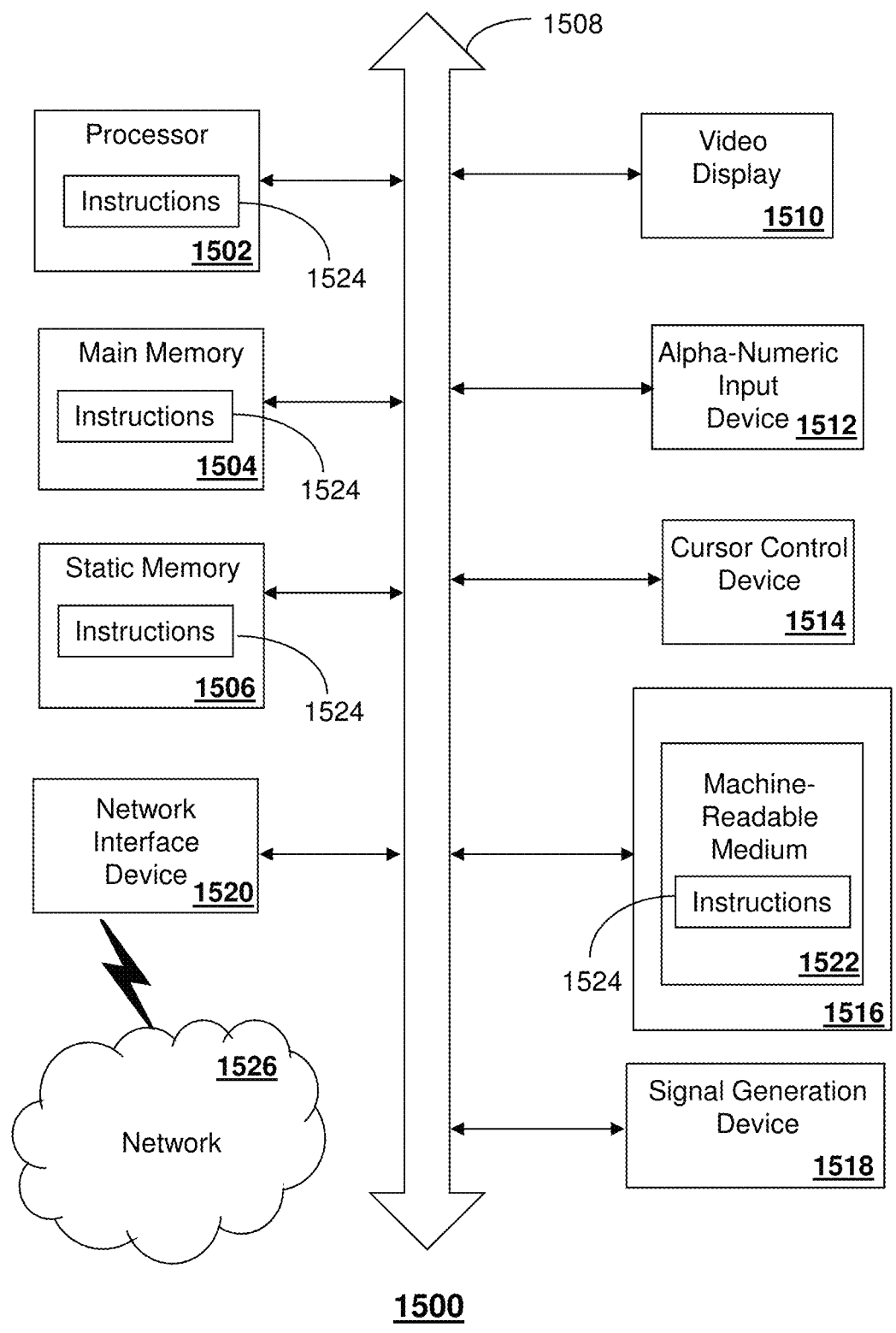
FIG. 15 is a diagrammatic representation of a machine in the form of a computer system within which a set of instructions, when executed, may cause the machine to perform any one or more of the methods described herein.

FIG. 15 depicts an exemplary diagrammatic representation of a machine in the form of a computer system 1500 within which a set of instructions, when executed, may cause the machine to perform any one or more of the methods described above. One or more instances of the machine can operate, for example, as the bandwidth predictor 115, the server 150, the end user device 101 and other devices of FIGS. 1-2 to enable dynamic adjustment of bit rates during streaming according to predicted available bandwidth and according to buffer occupancy.

In some embodiments, the machine may be connected (e.g., using a network 1526) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1500 may include a processor (or controller) 1502 (e.g., a central processing unit (CPU)), a graphics processing unit (GPU, or both), a main memory 1504 and a static memory 1506, which communicate with each other via a bus 1508. The computer system 1500 may further include a display unit 1510 (e.g., a liquid crystal display (LCD), a flat panel, or a solid state display). The computer system 1500 may include an input device 1512 (e.g., a keyboard), a cursor control device 1514 (e.g., a mouse), a disk drive unit 1516, a signal generation device 1518 (e.g., a speaker or remote control) and a network interface device 1520. In distributed environments, the embodiments described in the subject disclosure can be adapted to utilize multiple display units 1510 controlled by two or more computer systems 1500. In this configuration, presentations described by the subject disclosure may in part be shown in a first of the display units 1510, while the remaining portion is presented in a second of the display units 1510.

The disk drive unit 1516 may include a tangible computer-readable storage medium 1522 on which is stored one or more sets of instructions (e.g., software 1524) embodying any one or more of the methods or functions described herein, including those methods illustrated above. The instructions 1524 may also reside, completely or at least partially, within the main memory 1504, the static memory 1506, and/or within the processor 1502 during execution thereof by the computer system 1500. The main memory 1504 and the processor 1502 also may constitute tangible computer-readable storage media.

The exemplary embodiments can also employ other processes to dynamically adjust a bit rate during streaming of media content including a class of Prediction-Based Adaptation (PBA) algorithms that use the predicted bandwidth. Existing algorithms fail to fully utilize available bandwidth, achieving only 69%-86% of optimal quality. The performance gap is pronounced during startup where existing algorithms achieve only 15%-20% of optimal in the first 32 seconds, and 22%-38% of optimal in the first 64 seconds. Naive algorithms that utilize only predicted bandwidth for chunk rate selection do not work well and cause numerous and erratic quality switches. PBA that combines short-term predictions (e.g., one chunk duration) with buffer occupancy and/or rate stability function outperforms existing algorithms, achieving nearly 96% of optimal quality during startup and over the entire video, thereby outperforming existing algorithms by up to about 40%. PBA algorithms with different stability functions can trade off stalls and stability while maintaining much improved average quality.

Improvement can be achieved in video QoE by accurately predicting available bandwidth and exposing them to content providers through APIs.

The available bandwidth in both wired and wireless networks can vary over time. To overcome this variability, the industry has shifted towards ABR streaming to deliver videos over the Internet. ABR streaming is a client-driven approach in which a video client tries to match the delivery rate of the video to that of the available end-to-end bandwidth. To make this feasible, ABR streaming breaks videos into "chunks" of a few seconds (typically 2-10 sec) and encodes each chunk at multiple bit rates, representing different levels of quality. Multiple encoding bit rates also directly correlate to PSNR levels resulting from compressing the video signal. The client's task is to choose chunks of the "correct" encoding rate. Depending on the perceived network conditions, playout buffer or other criteria, clients can attempt to optimize various metrics that comprise users' QoE, including quality, interruptions and stability. For example, a client can switch to a low-quality version of the video to avoid buffer undertow during temporary network congestion, and switch back to higher quality after network conditions improve. Netflix, Microsoft Smooth Streaming, Apple HTTP Live Streaming (HLS) and Dynamic Adaptive Streaming over HTTP (DASH) have been deployed to in commercial systems to deliver content. While simple in principle, practical client implementations of ABR streaming have to infer the available bandwidth and adjust chunk encoding rates accordingly. State-of-the-art approaches typically use past observations to estimate available bandwidth. For example, FESTIVE is an adaptation algorithm that includes features intended to provide fair and stable performance even when multiple ABR video players compete for bandwidth. Among other features, FESTIVE uses harmonic mean of previous chunk throughputs and includes a stability function that delays video rate updates to minimize rate switches. In contrast, Buffer-Based Adaptation (BBA) is proposed to dispense with historical averaging and solely use buffer level to drive selection of video rates. The rationale is that buffer level indirectly reflects the historical throughput, which obviates a need for direct measurement and estimation. However, when the buffer is empty or very low, such as during the startup phase, historical bandwidth estimation is necessary.

The inaccurate inference of available bandwidth leads to inaccurate estimates of actual bandwidth, which results in low video QoE over cellular networks. The exemplary embodiments may not need to utilize synthetic traces. Instead, real traces may be utilized. Bandwidth prediction according to the exemplary embodiments can complement or replace existing algorithms to improve video QoE.

In a second rate selection algorithm, the video session can be divided into time intervals of length equal to chunk duration where knowledge of the available average bandwidth, during each chunk duration, is assumed. The highest possible quality for this session can be sought such that there are no interruptions.

While this may be an idealized setting, it provides an upper bound on the video quality possible and allows quantification of how well existing adaptation algorithms are performing. This optimal rate selection can be formulated as a Mixed Integer Linear Program (MILP). Table 1600 lists the variables and parameters used in the formulation. For the i-th video chunk, the optimization selects exactly one quality for playback. In other words, the indicator variable $x^q_i$ is one for exactly one quality level q and the chunk size is given by $$\text{Chunk Size}(i) = \sum_{q=1}^{Q} R_i^q * x_i^q.$$

For each video chunk i, the optimization needs to find its quality level ($x_i^q$) and the goal is to maximize $$\Sigma_i \text{ChunkSize}(i) = \Sigma_{i,q} R_i^q * x_i^q,$$

subject to constraints defined below.

Unique quality: One quality can be selected for each chunk:

$$\forall i, \sum_{q=1}^{Q} x_i^q = 1.$$

No stalls: To avoid interruptions, the i-th chunk can finish downloading by the end of chunk duration i to be played out in chunk duration i+1. In other words, we cannot download any portion of the i-th chunk in any chunk duration indexed higher than i:

$$\forall i, j > i, L_i^j = 0.$$

Limited buffer: We do not want to download too many chunks ahead of their play time because, in case of abandonment, these chunks represent wasted network bandwidth. For this reason, most practical implementations have a limited buffer size. This is captured by restricting that a chunk cannot get downloaded M chunk durations ahead of its play time:

$$\forall i, j \leq i - M, L_i^j = 0$$

Bandwidth availability: The predicted bandwidth in the j-th chunk duration, Cj, should be sufficient to download all (portions of) chunks downloaded in the j-th duration:

$$\forall j, \Sigma_i L_i^j \leq C_j.$$

Download consistency: Portions of i-th chunk downloaded in various chunk durations can sum up to the size of the i-th chunk:

$$\forall i, \Sigma_j L_i^j \geq \Sigma_{i,q} R_i^q * x_i^q.$$

There may not be constraints to force download of chunks in order and the solution may interleave the downloading of video chunks (e.g., download chunks 1 and 3 in the 1st chunk duration and then download chunk 2 in the 2nd chunk duration). It can be shown that given such a schedule, it can be transformed into a sensible schedule where chunks are downloaded in sequence without violating any of the constraints.

Other adaptation algorithms can be compared to the MILP using 20 4G/LTE cellular traces that were collected from several large US cellular providers. Each trace provides the per-second available bandwidth over 360 seconds. To accurately represent some of the more challenging conditions to deliver ABR video, the traces were obtained from various locations with different terrains (highways, local roads, etc.) and represent situations where bandwidth is more constrained and fluctuating quickly due to changing cellular conditions. The average bandwidth across traces is 6.5 Mbps. It can be assumed that each chunk is 4 seconds long and a maximum buffer of 64 seconds (or equivalently, 16 chunks). 10 different video encoding rates can be taken from one major content provider: 235, 375, 560, 750, 1050, 1750, 2350, 3000, 3850, and 4300 Kbps and assume constant bit rate for each chunk. The selected chunk duration and buffer size can approximate common settings of several content providers for wired and wireless environments. A few traces could not satisfy MILP's strict no-stall constraint. MILP was solved on the remaining traces using a solver and was compared with the average bit rate to those of FESTIVE and BBA.

Figure 17:
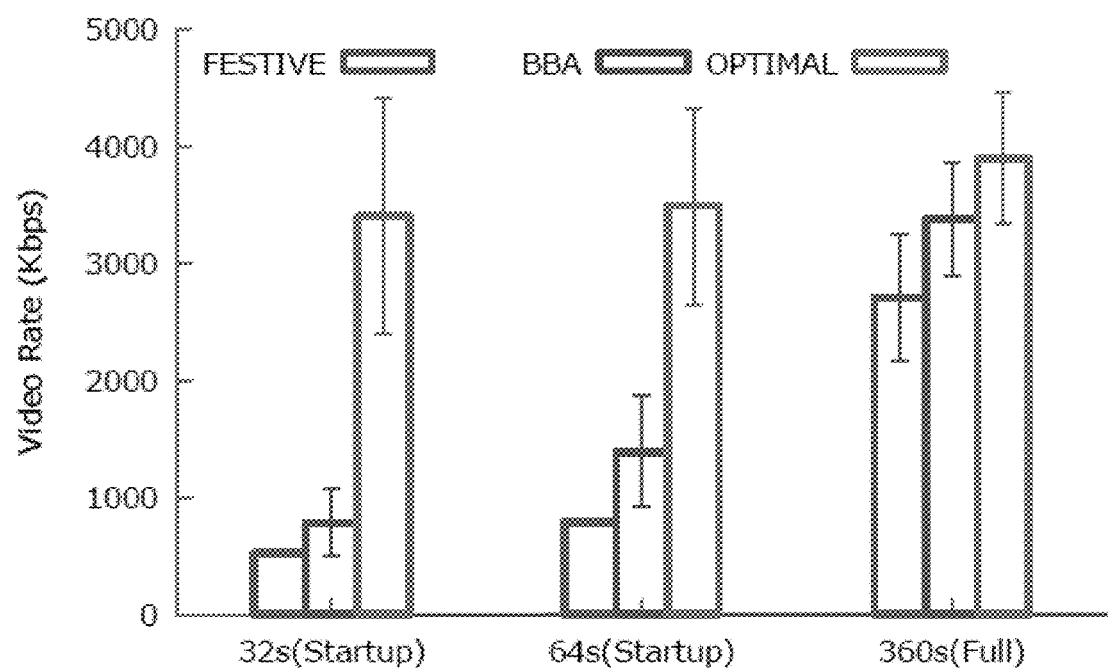
FIG. 17 depicts performance comparison of the exemplary algorithm with two prior known algorithms.

Full FESTIVE was implemented with recommended stability parameters and BBA-2 variant. Over the full traces of 360 sec (90 chunks), on average, FESTIVE and BBA achieve 68.6% and 85.7% of optimal, respectively, as in FIG. 17. Using a re-run of MILP to maximize the rate during short and long start-up phases of 32 and 64 seconds, it was determined that the achievable gains obtained by MILP are significantly higher. FESTIVE and BBA can reach only 15.0% and 20.1% of optimal for 32 sec, and 21.8% and 33.4% for 64 sec, respectively. These results show that significant benefits can be gained by prediction, especially during startup.

Online versions of PBA were developed by relaxing the assumption of perfect bandwidth knowledge for the entire session duration to shorter prediction horizons. A naive PBA selects the next chunk's quality based only on predicted bandwidth. This turns out to have unintended consequences. Then, a more sophisticated online PBA algorithm was developed that obtains significant improvements in quality by combining available bandwidth prediction for only the next few seconds (e.g., one chunk duration) with buffer occupancy or rate stability function.

The exemplary algorithm can be motivated with a naive solution: choose the highest bit rate that is less than the predicted bandwidth. The prediction horizons are short (1 chunk duration of 4 seconds), medium (5 chunks), and long (10 chunks). The client obtains a prediction just before each chunk download. It can be assumed that the future available bandwidth is known for a fixed time period and represented by a single average value.

Figure 18:
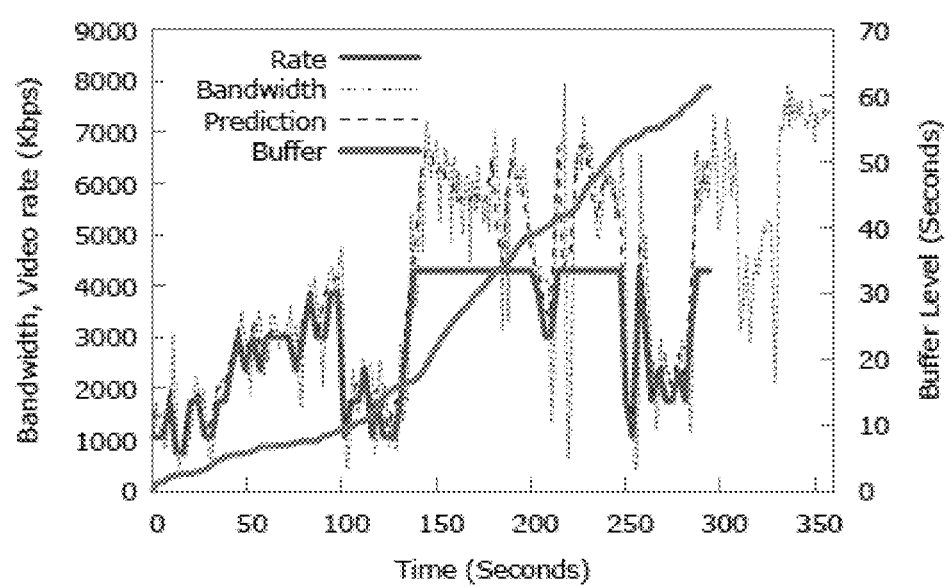
FIGS. 18-20 depict performance of another rate selection algorithm.
Figure 19:
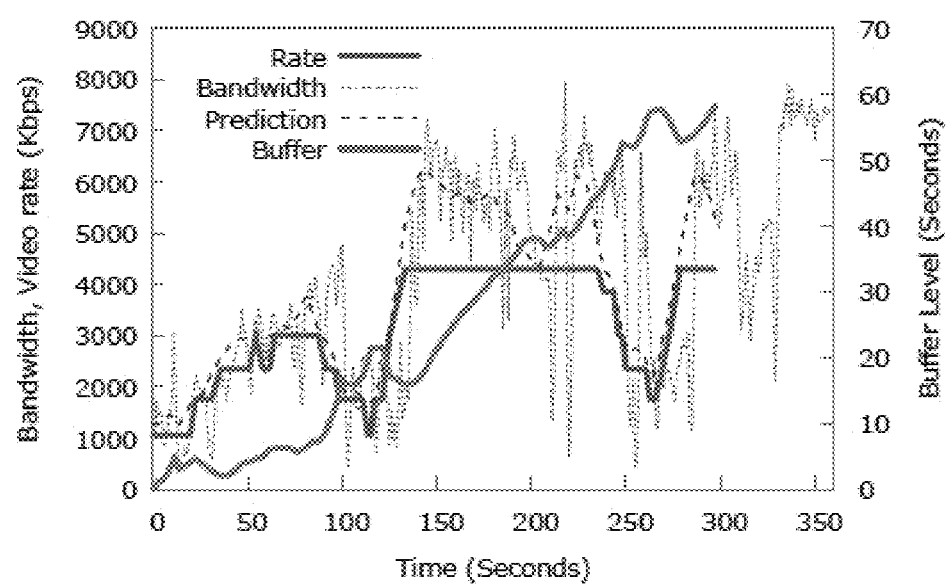
Figure 20:
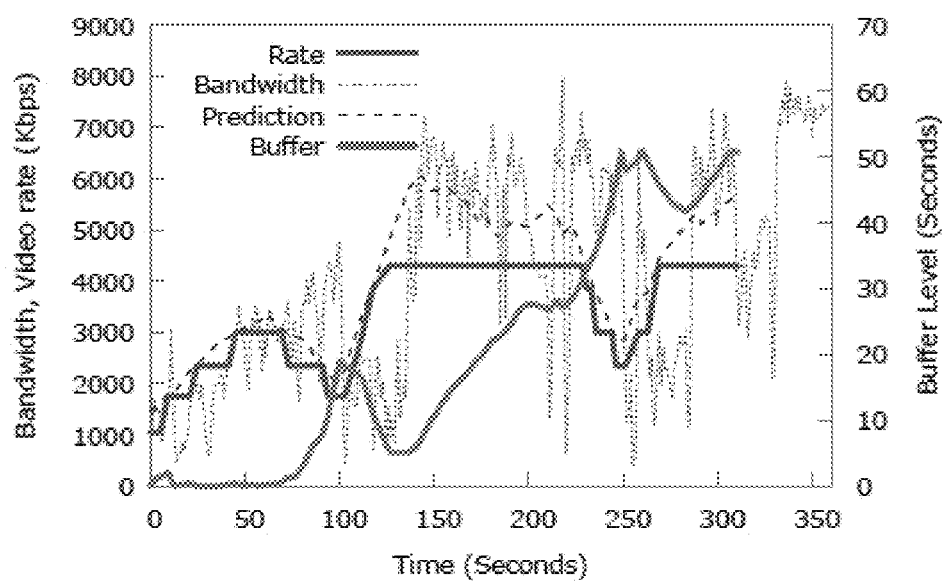

Evaluation: FIGS. 18-20 show the three behaviors for three prediction horizons. The video rate selection based on 1-chunk horizon closely follows predicted bandwidth, leading to numerous (39) and erratic quality switches (FIG. 18). This greedy rate selection is clearly reflected in very slow buffer filling, and no use of the buffer to stabilize quality.

FIG. 19 shows a 5-chunk horizon (20 seconds), which stabilizes quality (18 switches) by averaging predicted bandwidth over a longer period, and leads to better buffer use. However, in some instances, the buffer is not appropriately used, i.e., it is refilled while bandwidth has dropped (around 120 s), and drained while bandwidth is increasing (around 40 seconds).

Finally, FIG. 20 shows another extreme by taking a 10 chunk horizon (40 seconds), further stabilizing quality to 14 switches. However, this causes stalls (a cumulative stall time of 7.2 sec), because the long-term average does not include information about bandwidth variability and outages within the prediction horizon. In addition, buffer level is not considered during startup to recognize the danger of undertow due to high bandwidth variability. While the average quality between three scenarios is similar (3.05 to 3.34 Mbps), the QoE differs significantly. There are several shortcomings of the sole use of prediction to determine quality: (i) stability is heavily impacted by highly fluctuating bandwidth, (ii) buffer fills slowly risking undertow because most of the bandwidth is used to maximize quality, and (iii) even when buffer level is high, it may not be used appropriately with respect to bandwidth fluctuations. These shortcomings can be takeaways to drive the design of prediction-based adaptation algorithm that improves video QoE, by considering stability, stalls, and buffer occupancy.

Existing adaptation algorithms are not designed to use prediction. For the second rate selection algorithm, the exemplary PBA uses prediction, explicitly considers buffer occupancy and aggressively tries to stabilize rate selection, as illustrated in FIG. 21. The buffer can be divided into three zones {safe, transient, and risky} based on two buffer occupancy thresholds, Bsafe and Brisky. The safe and risky thresholds can be set to 90% and 30% of buffer size Bmax, respectively. A decision on the video rate for the next chunk, Rnext, can be made differently depending on the zone in which the current buffer occupancy B is, predicted available bandwidth C, and last video rate downloaded Rlast. Algorithm 2100 of FIG. 21 provides the pseudo-code. The algorithm starts by checking the buffer occupancy against the target maximum Bmax, and waits in case there is not enough space to store the next chunk of duration D, thereby protecting from buffer overrun. Once buffer space is available, the first step is to select a reference video rate, Rref, to be the highest available rate below predicted bandwidth C. In the risky zone, a conservative approach is used to prevent stalls and replenish the buffer, by first reducing Rref by one level. If Rref is higher than the rate of last chunk, Rlast, an upswitch to Rref can be performed. However, if Rref is lower than Rlast, this means that the reduction is recommended. To avoid sudden quality drop to Rref, the highest rate R can be selected without draining the buffer to less than two chunks, which performs better than one chunk when variable chunk sizes are used. B=D is the number of chunks in the buffer before requesting next chunk, C=R is the additional number of chunks that will be downloaded, while −1 represents one chunk that is expected to be played from the buffer while the next chunk is retrieved. During startup, with B=0, this constraint selects the rate of the first chunk equal to ⅓rd of the predicted bandwidth. If such a rate cannot be found, the only decision that can be made is to select the lowest rate R1.

In the safe zone, the algorithm aggressively selects the larger of Rref and Rlast to maintain stability and ride out short-term bandwidth variations. In the transient zone, various approaches can be taken to balance the buffer occupancy, high quality, stability, and other objectives. In this implementation, a more aggressive approach can be taken. When Rref is lower than Rlast, Rlast can be utilized with the expectation that bandwidth will recover. If Rref is higher than Rlast, it is desired to grow the buffer.

The algorithm can select rate Rref if downloading at Rref will allow at least 15% of the empty buffer space to be filled. Otherwise, a reduction by one rate can be performed and select Rref−1.

Figure 22:
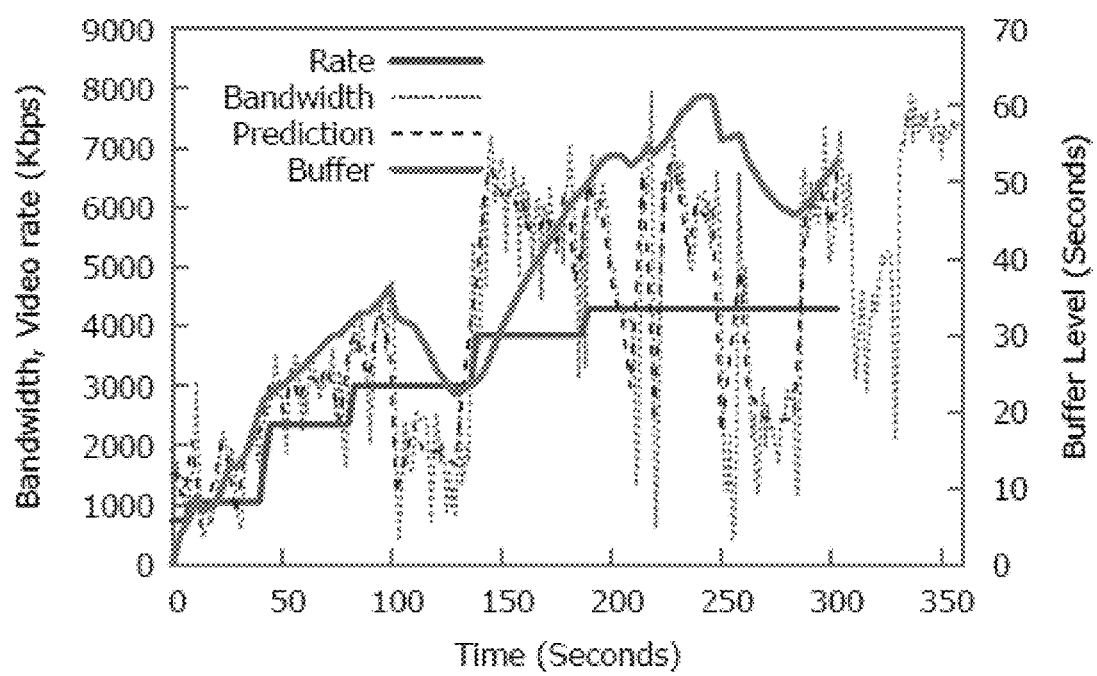
FIG. 22 depicts results of implementation of an exemplary PBA process.

Evaluation: FIG. 22 for the second rate selection algorithm shows for a specific trace how PBA behaves when buffer level is taken into consideration. Compared to naive PBA, the buffer is filled faster during startup, which is desirable. When the buffer level is moderate to high, it is aggressively exploited to ride out short fade durations and maintain high quality (100-140 seconds and 260-280 seconds). The average rate over 360 sec is 3.15 Mbps with no stalls and only 6 rate switches. Therefore, average quality is similar to naive PBA, but with significantly improved stability and appropriate buffer usage.

Next, PBA can be compared to FESTIVE and BBA. In addition to the exemplary PBA algorithm, an alternative is implemented using a known stability function employed by FESTIVE, called "delayed update". Using the aforementioned data set, simulations can be run to investigate how close to optimal each adaptation algorithm gets. For the second rate selection algorithm FIG. 23 lists algorithms and the percentage of optimal (MILP) they can achieve using a 64-second buffer. Recall that over the entire trace durations, FESTIVE and BBA come within 68.6% and 85.7% of optimal, respectively. PBA with buffer-based stability function (PBA-BB) reaches 95.8% of optimal quality, representing a relative improvement of about 40% over FESTIVE. PBA with delayed update (PBA-DU) is within 91.4% of optimal quality. During startup phase (32 s), the value of prediction becomes abundantly clear, with up to 95.8% of optimal quality, while FESTIVE and BBA remain extremely sub-optimal. Comparing metrics other than video quality shows a slight advantage of BBA because of fewer stalls. This is not surprising given that BBA is designed specifically to avoid stalls, unlike PBA and FESTIVE. While FESTIVE and BBA are nearly as stable as optimal, PBA-BB registers the best stability, and PBA-DU reduces stalls by decreasing stability, which is a very desirable trade-off. PBA algorithms with different stability functions can trade off stalls and stability while maintaining much improved average quality. The benefit of prediction can be quantified, i.e., to show that the benefits come from prediction and not from other parts of the adaptation algorithm. This is not a straightforward task, since every algorithm is designed to work best with a specific bandwidth estimate. Nevertheless, a benchmark is illustrated using the exemplary adaptation algorithm with two stability functions and swap predicted bandwidth with output of other heuristics. This approach maintains the adaptation process the same except how the reference rate is computed. A harmonic mean of last 10 chunks and last chunk throughput can be utilized as the two heuristics, and 4-second (1 chunk) look-ahead for PBA. Harmonic mean is the core feature of FESTIVE and last chunk throughput is used by BBA during startup. For the second rate selection algorithm FIG. 24 shows the relative improvement that prediction (PBA) offers compared to other heuristics for a given stability function. Several observations can be made. First, when looking at the average bit rates over the entire trace of 360 sec, all algorithms do well. Prediction provides up to 4.8% improvement on average quality while maintaining overall better number of stalls and switching statistics. Second, during the "startup" phase, prediction offers nearly 18% improvement in video rate compared to harmonic mean. Finally, out of the three, last chunk strategy performs the worst in terms of stall and switch statistics. On the other hand, harmonic-based strategy has commensurate stall and switching statistics.

With "delayed update", prediction outperforms others by a similar margin during startup phase. Prediction offers significant reduction in the number of stalls and the cumulative time stalled. However, this comes at the expense of an increased number of switches. Reducing the number of stalls is a desirable feature in terms of customer engagement. Finally, PBA is stall-free in 6 more traces than harmonic (a 25% improvement).

While the results show that accurate predictions of available network bandwidth improve the quality of video over cellular networks, generating accurate predictions is non-trivial. The cellular radio link is carefully scheduled. A base station tracks multiple network metrics and uses them in the scheduling process. In addition, the architecture of the network allows an operator to have a view of all devices, their link statistics, radio spectrum availability, mobility patterns, and instantaneous traffic demand. It is sometimes possible to get very accurate predictions (98% accuracy) for short time periods (500 msec) just by observing network performance at a stationary client device. Good mobility models and feasible throughput predictions over short time periods (5 seconds) can be obtained even when users are mobile. This indicates that it is feasible for cellular operators to predict available bandwidth accurately. In one exemplary embodiment, multiple predictions (e.g., a very accurate short term prediction and an indicative long term prediction) or even a distribution of bandwidth over the predicted period can be utilized.

In one embodiment, a throughput guidance protocol can be utilized where bandwidth information is embedded in TCP headers. This approach makes the information available to TCP stacks of senders, to be potentially used by all applications. In another embodiment, the cellular provider can expose bandwidth predictions through an API that applications query each time they start downloading a video chunk.

The exemplary embodiments provide for collecting and analyzing various network information including user mobility, channel quality for millions of users and generating predictions in real time to be useful for video rate selection (and other possible applications). In one embodiment, a system can partition the network into small areas and independently compute predictions for each area.

A cellular operator typically has access to a range of in-network measurements that can be potentially used for making short to mid-term bandwidth predictions. Leveraging bandwidth predictions when implementing video adaptation algorithms can significantly improve video QoE. During startup, the exemplary PBA algorithm can deliver more than 4× better video quality compared to heuristic-based algorithms. This is important since it has been shown that users typically abandon in the first few minutes of the video if the picture quality suffers. A naive algorithm that solely uses prediction does not do well and that a combination of prediction with buffer occupancy and/or stability function can be used to extract the maximum benefit. PBA algorithms with different stability functions can trade off stalls and stability while maintaining much improved average quality.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium, comprising executable instructions that, when executed by a processor, facilitate performance of operations, comprising:
   obtaining a predicted available bandwidth for an end user device according to first performance data that includes channel quality indicator data, reference signal received quality data or a combination thereof and according to second performance data that includes cell congestion data, wherein the first performance data is of the end user device and the second performance data is associated with a cell of a wireless network in which the end user device is operating;
   determining one or more buffer occupancy thresholds associated with the end user device;
   determining a buffer occupancy for the end user device;
   comparing the buffer occupancy with the one or more buffer occupancy thresholds; and
   according to an analysis of the predicted available bandwidth and the comparing of the buffer occupancy with the one or more buffer occupancy thresholds, determining a video bit rate for a portion of media content, wherein the video bit rate is applied during streaming of the portion of the media content over a wireless network to the end user device.

2. The non-transitory machine-readable storage medium of claim 1, wherein the operations further comprise:
   obtaining a second predicted available bandwidth for the end user device;
   determining a second buffer occupancy for the end user device;
   comparing the second buffer occupancy with the one or more buffer occupancy thresholds;
   determining a second video bit rate for a second portion of the media content according to the second predicted available bandwidth and according to the comparing of the second buffer occupancy with the one or more buffer occupancy thresholds; and
   applying the second video bit rate during streaming of the second portion of the media content over the wireless network to the end user device.

3. The non-transitory machine-readable storage medium of claim 2, wherein the predicted available bandwidth is determined according to the channel quality indicator data, and the reference signal received quality data.

4. The non-transitory machine-readable storage medium of claim 1, wherein the obtaining of the predicted available bandwidth comprises:
   transmitting a request for the predicted available bandwidth; and
   responsive to an authentication of the processor, receiving the predicted available bandwidth from a network server of the wireless network.

5. The non-transitory machine-readable storage medium of claim 4, wherein the predicted available bandwidth is for a time period covering a chunk of the media content and less than an entirety of the media content, and wherein the predicted available bandwidth is determined according to the channel quality indicator data and the reference signal received quality data.

6. The non-transitory machine-readable storage medium of claim 1, wherein the predicted available bandwidth is determined according to a mobility pattern.

7. The non-transitory machine-readable storage medium of claim 1, wherein the streaming of the portion of the media content over the wireless network is according to a dynamic adaptation streaming over HTTP protocol.

8. The non-transitory machine-readable storage medium of claim 1, wherein the obtaining of the predicted available bandwidth comprises accessing bandwidth data from a network server of the wireless network via an application programming interface.

9. The non-transitory machine-readable storage medium of claim 1, wherein the predicted available bandwidth is determined according to prediction information collected by a network server from an eNodeB, wherein the prediction information includes channel quality, a number of active users, a cell load, and throughput data.

10. The non-transitory machine-readable storage medium of claim 1, wherein the determining of the video bit rate for the portion of the media content comprises:
selecting a reference video bit rate according to the comparing of the buffer occupancy with the one or more buffer occupancy thresholds,
determining a current video bit rate applied during streaming of a previous portion of the media content over the wireless network, and
comparing the reference video bit rate with the current video bit rate.

11. A method comprising:
obtaining, by a system including a network server, first performance data of an end user device and second performance data associated with a cell of a wireless network in which the end user device is operating, wherein the first performance data includes channel quality indicator data, reference signal received quality data or a combination thereof, and wherein the second performance data includes cell congestion data;
determining, by the system, a predicted available bandwidth for the end user device according to the first and second performance data;
receiving, by the system from a processor, a request for the predicted available bandwidth for the end user device;
providing, by the system to the processor, the predicted available bandwidth for the end user device to cause a video bit rate to be determined for a portion of media content according to the predicted available bandwidth for the end user device and according to a comparison of a buffer occupancy of the end user device with a buffer threshold for the end user device; and
facilitating, by the system over the wireless network, streaming of the portion of the media content to the end user device utilizing the video bit rate.

12. The method of claim 11, wherein the providing of the predicted available bandwidth for the end user device to the processor is responsive to a determination that the processor is permitted to access available bandwidth data.

13. The method of claim 11, comprising:
obtaining mobility data associated with the end user device; and
determining a mobility pattern for the end user device, wherein the predicted available bandwidth is determined according to the mobility pattern of the end user device.

14. The method of claim 11, wherein the streaming of the portion of the media content to the end user device over the wireless network is according to a dynamic adaptation streaming over HTTP protocol, and wherein the predicted available bandwidth is for a time period covering one or more chunks of the media content and less than an entirety of the media content.

15. The method of claim 11, wherein the obtaining of the first and second performance data comprises collecting, by the system, data from an eNodeB, and wherein the cell congestion data includes throughput data and a number of active users associated with the cell.

16. A system, comprising:
a hardware processor; and
a memory that stores executable instructions that, when executed by the hardware processor, facilitate performance of operations, comprising:
obtaining predicted available bandwidths for an end user device, wherein the predicted available bandwidths are determined according to first performance data that includes channel quality indicator data, reference signal received quality data or a combination thereof and according to second performance data that includes cell congestion data, wherein the first performance data is of the end user device and the second performance data is associated with a cell of a wireless network in which the end user device is operating;
monitoring buffer occupancy of a buffer of the end user device;
determining video bit rates for portions of media content according to the predicted available bandwidths and according to the buffer occupancy; and
adjusting video bit rates for portions of media content according to the predicted available bandwidths and the buffer occupancy during streaming of the media content to the end user device.

17. The system of claim 16, wherein the obtaining of the predicted available bandwidths for the end user device comprises:
transmitting, to a network server, a request for the predicted available bandwidths for the end user device; and
responsive to an authentication of the system, receiving, from the network server, the predicted available bandwidths.

18. The system of claim 16, wherein the streaming of the media content to the end user device is according to a dynamic adaptation streaming over HTTP protocol.

19. The system of claim 16, wherein the determining of the video bit rates for the portions of the media content comprises:
selecting a reference bit rate according to comparing the buffer occupancy with a buffer threshold,
determining a second bit rate applied during streaming of a previous portion of the media content to the end user device, and
comparing the reference bit rate with the second bit rate.

20. The system of claim 16, wherein the obtaining of the predicted available bandwidths for the end user device comprises accessing bandwidth data from a network server via an application programming interface, and wherein the portions of the media content correspond to chunks of the media content according to a dynamic adaptation streaming over HTTP protocol.

* * * * *